United States Patent
Tang

(10) Patent No.: US 12,323,443 B2
(45) Date of Patent: Jun. 3, 2025

(54) ATTACK BEHAVIOR DETECTION METHOD AND APPARATUS, AND ATTACK DETECTION DEVICE

(71) Applicant: Huawei Technologies Co., Ltd., Shenzhen (CN)

(72) Inventor: Yubin Tang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 392 days.

(21) Appl. No.: 17/867,976

(22) Filed: Jul. 19, 2022

(65) Prior Publication Data

US 2022/0368706 A1    Nov. 17, 2022

Related U.S. Application Data

(63) Continuation of application No. PCT/CN2020/118782, filed on Sep. 29, 2020.

(30) Foreign Application Priority Data

Feb. 27, 2020    (CN) .................... 202010123839.X

(51) Int. Cl.
*H04L 9/40*    (2022.01)
*H04L 67/02*    (2022.01)

(52) U.S. Cl.
CPC ...... *H04L 63/1425* (2013.01); *H04L 63/1416* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 2016/0028746 A1 | 1/2016 | Tonn | |
| 2016/0028754 A1 | 1/2016 | Cruz Mota et al. | |
| 2016/0337387 A1 | 11/2016 | Hu et al. | |
| 2018/0004941 A1* | 1/2018 | Reinecke | G06F 21/566 |
| 2020/0226476 A1* | 7/2020 | Wang | G06N 5/02 |

(Continued)

FOREIGN PATENT DOCUMENTS

| | | |
|---|---|---|
| CN | 105227548 A | 1/2016 |
| CN | 107770168 A | 3/2018 |
| CN | 108418843 A | 8/2018 |

(Continued)

OTHER PUBLICATIONS

Zeng Sai-wen et al., "Analysis of Network Security Based Oil Uncertain Attack Graph Path," Computer Science, vol. 44, No. 6A, Jun. 2017, with an English abstract, 5 pages.

(Continued)

*Primary Examiner* — Syed A Roni
(74) *Attorney, Agent, or Firm* — Conley Rose, P.C.

(57) ABSTRACT

An attack behavior detection apparatus configured to obtain Hypertext Transfer Protocol (HTTP) packet flow data from a host within a reference time period, determine a plurality of initial probability values using a plurality of behavior detection models, determine a comprehensive probability value based on the initial probability values, and determine that an exploit kit (EK) attack behavior is detected when the comprehensive probability value is greater than a preset probability threshold.

20 Claims, 6 Drawing Sheets

(56) References Cited

U.S. PATENT DOCUMENTS

2020/0285893 A1  9/2020  Kim et al.

FOREIGN PATENT DOCUMENTS

CN  110075524 A  8/2019
KR  102007809 B1  8/2019

OTHER PUBLICATIONS

Zhang Xia, "Analysis of network security situation assessment based on multi-step attack," Electronic information, DOI:10.19392/j.cnki.1671-7341.201714047, 2017, with an English abstract, 4 pages.

Ma Shunli, "Simulation Research on Real Time Detection of Network Information Encryption Vulnerability," Computer simulation, 10.3969/j.issn.1006-9348.2018.03.071, 2018, with an English abstract, 4 pages.

* cited by examiner

ATTACK BEHAVIOR DETECTION METHOD AND APPARATUS, AND ATTACK DETECTION DEVICE

CROSS-REFERENCE TO RELATED APPLICATIONS

This application is a continuation of International Patent Application No. PCT/CN2020/118782 filed on Sep. 29, 2020, which claims priority to Chinese Patent Application No. 202010123839.X filed on Feb. 27, 2020. The disclosures of the aforementioned applications are hereby incorporated by reference in their entireties.

TECHNICAL FIELD

This disclosure relates to the field of network security technologies, and in particular, to an attack behavior detection method and apparatus, and an attack detection device.

BACKGROUND

In order to attack a host such as a user terminal, a malicious attacker may use an exploit kit (EK) to spread malware. The EK is a set of tools and may be considered as an attack means spreading malware through downloading. When the host accesses a malicious web site with an EK, the EK selects corresponding malware based on vulnerability information in a network environment of the host to attack the host. If an EK attack behavior can be detected in time, a user can be reminded to take a measure in time to prevent the attack from the EK, so as to minimize a user loss.

In the conventional technology, in a process of accessing a web site, the host may collect and detect script code of the website, parse the script code, and generate a signature of the script code. Then, the host compares the generated signature with a signature stored in a signature database, to determine whether an EK attack behavior occurs when the host accesses the website. The signature stored in the signature database is generated by using a signature algorithm based on known malicious code of a known EK.

However, the collected script code usually includes privacy data of the user, and this causes a risk of infringing user privacy. In addition, parsing the script code occupies quite a lot of processor resources and memory resources, which deteriorates performance of the host.

SUMMARY

This disclosure provides an attack behavior detection method and apparatus, and an attack detection device, to reduce a risk of infringing user privacy in the conventional technology, and improve attack behavior detection accuracy without consuming resources of a host. Technical solutions are as follows.

According to a first aspect, an attack behavior detection method is provided. The method includes obtaining Hypertext Transfer Protocol (HTTP) packet flow data transmitted by a host within a reference time period, where the HTTP packet flow data includes data in one or more HTTP packets, the one or more HTTP packets belong to a first data flow, and the reference time period is a time period from which there is reference duration before a current time, determining a plurality of initial probability values based on the HTTP packet flow data by using a plurality of behavior detection models, where the plurality of behavior detection models are used to describe different phases of a track of an EK attack behavior, and the initial probability value is a probability value output by one of the plurality of behavior detection models, determining a comprehensive probability value based on the plurality of initial probability values, where the comprehensive probability value is used to indicate a possibility that the host is attacked by an EK in a process in which the host transmits the first data flow, and if the comprehensive probability value is greater than a preset probability threshold, determining that the EK attack behavior exists in the process in which the host transmits the first data flow.

In this disclosure, the track of the EK attack behavior includes the plurality of different phases. In a running process, the host transmits HTTP packet flow (data flow) data, but the HTTP packet flow data transmitted by the host attacked by the EK carries some behavior features of an EK attack. Based on this, the attack detection device may obtain the HTTP packet flow data transmitted by the host within the reference time period, and then analyze and process the HTTP packet flow data, to detect whether the host is attacked by the EK, namely, to detect whether the EK attack behavior exists in the process in which the host transmits the data flow.

If the host is attacked by the EK, HTTP packets are continuously transmitted between the host and an EK attack device within a period of time. Therefore, in this solution, an HTTP packet flow data needs to be obtained within a period of time, namely, the HTTP packet flow data needs to be obtained within the reference time period. The HTTP packet flow data includes data in one or more HTTP packets, the one or more HTTP packets belong to a first data flow, and the first data flow is a data flow including HTTP packets transmitted between the host and a device. The reference time period is a time period from which there is reference duration before a current time.

In this disclosure, the attack detection device may perform data preprocessing on the obtained HTTP packet flow data to obtain an input for each of the plurality of behavior detection models, and process the corresponding input by using the behavior detection model to obtain a corresponding initial probability value, so as to obtain the plurality of initial probability values. The plurality of behavior detection models is used to describe the different phases of the track of the EK attack behavior.

Optionally, determining a plurality of initial probability values based on the HTTP packet flow data by using a plurality of behavior detection models includes selecting one behavior detection model from the plurality of behavior detection models, and performing the following operations by using the selected behavior detection model until the following operations has been performed for each of the plurality of behavior detection models: determining, based on the HTTP packet flow data, a feature vector corresponding to the selected behavior detection model, and typing the feature vector into the selected behavior detection model, to obtain an initial probability value output by the selected behavior detection model.

In this disclosure, the plurality of behavior detection models is used to describe the different phases of the track of the EK attack behavior, that is, one behavior detection model may be used to describe one phase of the track of the EK attack behavior, and behavior features of the EK attack behavior are different in the different phases. Therefore, feature vectors typed into the behavior detection models are also different, that is, feature vectors that correspond to the behavior detection models and that are determined based on the HTTP packet flow data from the host are also different.

In this disclosure, the track of the EK attack behavior includes the phases such as a redirection phase, an attack object screening phase, a vulnerability exploitation phase, and a malware download phase. Based on this, the plurality of behavior detection models may be used to describe at least any two of the four phases, that is, the plurality of behavior detection models includes at least two models used to describe any two of the four phases respectively. In other words, optionally, the plurality of behavior detection models includes at least two of the following models: a redirection detection model, an attack object screening detection model, a vulnerability exploitation detection model, and a malware download detection model.

The redirection detection model is used to describe the redirection phase of the track of the EK attack behavior. In this phase, an EK attack redirects a web page or the like currently browsed by a user. The attack object screening detection model is used to describe the attack object screening phase of the track of the EK attack behavior. In this phase, the EK screens an attack object based on information such as an operating system and a browser version carried in an HTTP packet transmitted by the host. The vulnerability exploitation detection model is used to describe the vulnerability exploitation phase of the track of the EK attack behavior. In this phase, the EK analyzes a vulnerability on the host and downloads a vulnerability file to the host. For example, a flash plug-in of an earlier version on the host may have a vulnerability. The EK downloads a flash vulnerability file to the host, performs a brute-force attack on the host, and the like. The malware download detection model is used to describe the malware download phase of the track of the EK attack behavior. In this phase, the EK downloads malware such as Trojan horse software and ransomware to the host.

In this embodiment of this disclosure, the attack detection device may obtain, from the HTTP packet flow data, one or more features included in a feature vector corresponding to each behavior detection model. In addition, data in one HTTP packet includes a plurality of fields, each field represents a type of information, and all features included in a feature vector may be separately obtained from these fields.

It should be noted that a plurality of behavior features of the EK attack behavior may be classified as a public feature and a private feature. The public feature is a feature common to each behavior detection model, or a feature common to some behavior detection models. The private feature is a feature private to a behavior detection model. In other words, the feature vector corresponding to each behavior detection model includes one or more features, and some of the one or more features are public features, and the others are private features.

For the redirection detection model, because the redirection detection model is used to describe the redirection phase of the track of the EK attack behavior, an HTTP packet transmitted by the host may carry a location (direction) field. The location field is used to redirect a web page browsed through the host. Based on this, a feature vector corresponding to the redirection detection model includes a behavior feature in the redirection phase, for example, a feature such as an HTTP packet message code, a length of a Uniform Resource Locator (URL) field, or whether a location field is carried. The HTTP packet message code is a public feature of the redirection detection model and the vulnerability exploitation detection model. The length of the URL field is a public feature of the foregoing four models. Whether the HTTP packet flow data carries a location field is a private feature of the redirection detection model.

For the attack object screening detection model, the attack object screening detection model is used to describe the attack object screening phase of the track of the EK attack behavior. Based on this, a feature vector corresponding to the attack object screening detection model includes a behavior feature in the attack object screening phase, for example, a length of a URL field, or a type of an operating system. Optionally, the type of the operating system is a private feature of the attack object screening detection model.

For the vulnerability exploitation detection model, the vulnerability exploitation detection model is used to describe the vulnerability exploitation phase of the track of the EK attack behavior, and a field in an HTTP packet transmitted by the host in this phase may be changed, including adding a field, tampering with data, encrypting a field, or the like. Based on this, a feature vector corresponding to the vulnerability exploitation detection model includes a behavior feature in the vulnerability exploitation phase, for example, an HTTP packet message code, a length of a URL field, whether a URL field includes a Base64-encoded substring, or whether an X-flash-version field is carried. Optionally, whether the URL field includes the Base64-encoded substring and whether the X-flash-version field is carried are private features of the vulnerability exploitation detection model.

For the malware download detection model, the malware download detection model is used to describe the malware download phase of the track of the EK attack behavior. Based on this, a feature vector corresponding to the malware download detection model includes a behavior feature in the malware download phase, for example, an HTTP packet message code, a length of a URL field, a content-type field in an HTTP packet, or a content-length field in an HTTP packet. It should be noted that an HTTP packet includes an HTTP request packet and an HTTP response packet, and the HTTP response packet carries a content-type field and a content-length field.

After determining a feature vector corresponding to one model, the attack detection device types the feature vector into the corresponding model, and uses a probability value output by the model as an initial probability value. The attack detection device performs the operation on all the four models to obtain four initial probability values.

Optionally, before determining a plurality of initial probability values based on the HTTP packet flow data by using a plurality of behavior detection models, the method further includes filtering the HTTP packet flow data according to a filter rule set. Determining a plurality of initial probability values based on the HTTP packet flow data by using a plurality of behavior detection models includes determining the plurality of initial probability values by using the plurality of behavior detection models based on remaining HTTP packet flow data obtained through filtering. In other words, the attack detection device may first filter out data in an HTTP packet that does not need to be detected, and then determine the plurality of initial probability values by using the plurality of behavior detection models.

Optionally, the filter rule set includes, but is not limited to, the following rules.

A first filter rule: A match item of the first filter rule is a reference type set including a type or types of one or more operating systems. The reference type set includes a type of an operating system for which a probability of being attacked by an EK is less than a reference probability threshold. An action of the first filter rule is filtering out. The first filter rule is used to filter out data in a first destination HTTP packet. The first destination HTTP packet is an HTTP packet carrying an operating system whose type is included in the reference type set.

A second filter rule: A match item of the second filter rule is one or more intranet addresses. An action of the second filter rule is filtering out. The second filter rule is used to filter out data in a second destination HTTP packet. The second destination HTTP packet is an HTTP packet carrying a destination address which is the intranet address.

A third filter rule: A match item of the third filter rule is a reference domain name set including one or more domain names. The reference domain name set includes a domain name whose access frequency is greater than a frequency threshold. An action of the third filter rule is filtering out. The third filter rule is used to filter out data in a third destination HTTP packet. The third destination HTTP packet is an HTTP packet carrying a domain name included in the reference domain name set.

In other words, after obtaining the HTTP packet flow data transmitted by the host within the reference time period, the attack detection device may filter out data in an HTTP packet carrying the operating system whose type is a low-risk operating system, data in an HTTP packet carrying the destination address which is the intranet address, and/or data in an HTTP packet carrying the domain name which is a domain name with high access frequency.

In this disclosure, whether the EK attack behavior exists cannot be determined based on only one single initial probability value, that is, a single factor usually has a relatively low association with the EK. Therefore, after the plurality of initial probability values is determined by using the plurality of behavior detection models, the attack detection device may perform comprehensive processing on the plurality of initial probability values to determine the comprehensive probability value. The comprehensive probability value is used to indicate a possibility that the host is attacked by the EK in the process in which the host transmits the first data flow.

Optionally, determining a comprehensive probability value based on the plurality of initial probability values includes determining a plurality of cross features based on the plurality of initial probability values, where the cross feature is obtained by multiplying two different initial probability values in the plurality of initial probability values, generating a cross feature vector based on the plurality of cross features, and typing the cross feature vector into an association analysis model to obtain the comprehensive probability value output by the association analysis model, where the association analysis model is used to perform comprehensive analysis on the plurality of different phases of the track of the EK attack behavior.

Optionally, before determining a plurality of cross features based on the plurality of initial probability values, the method further includes performing vulnerability file detection and malware detection on the HTTP packet flow data to obtain a vulnerability file detection result and a malware detection result, and determining a plurality of cross features based on the plurality of initial probability values includes determining the plurality of cross features based on the plurality of initial probability values, the vulnerability file detection result, and the malware detection result, where the cross feature is obtained by multiplying two pieces of different data in the plurality of initial probability values, the vulnerability file detection result, and the malware detection result.

A method for performing vulnerability file detection and malware detection on the HTTP packet flow data is a method for performing detection based on an intrusion prevention system (IPS). The IPS may analyze a field and a character included in the HTTP packet flow data to obtain the vulnerability file detection result and the malware detection result.

Optionally, determining the plurality of cross features based on the plurality of initial probability values, the vulnerability file detection result, and the malware detection result includes generating a probability matrix based on the plurality of initial probability values, the vulnerability file detection result, and the malware detection result, where the probability matrix is a matrix of X rows and X columns, X is a total quantity of the plurality of initial probability values, the vulnerability file detection result, and the malware detection result, both the X rows and the X columns correspond to the plurality of initial probability values, the vulnerability file detection result, and the malware detection result, and an element in the probability matrix is obtained by multiplying two pieces of cross-connected data, and screening a plurality of elements from the probability matrix according to a cross feature selection policy, and using the plurality of screened elements as the plurality of cross features. It should be noted that in this disclosure, the cross feature selection policy is a policy determined based on experience, and is used to filter out a redundant feature.

After obtaining the plurality of cross features through screening according to the cross feature selection policy, the attack detection device may generate the cross feature vector based on the foregoing related descriptions, and type the cross feature vector into the association analysis model to output the comprehensive probability value. If the comprehensive probability value is greater than the preset probability threshold, the attack detection device determines that the EK attack behavior exists in the process in which the host transmits the first data flow, that is, the host is attacked by the EK.

It should be noted that the plurality of attack behavior detection models is a plurality of models determined in advance based on training samples. In other words, before determining a plurality of initial probability values based on the HTTP packet flow data by using a plurality of behavior detection models, the method further includes obtaining a plurality of training samples and a sample label corresponding to each of the plurality of training samples, where the training sample includes data in one or more sample HTTP packets belonging to a second data flow, the sample label is used to indicate whether a corresponding training sample is a positive training sample or a negative training sample, the positive training sample is HTTP packet flow data that is not attacked by an EK, and the negative training sample is HTTP packet flow data that is attacked by the EK, and training a plurality of initial detection models based on the plurality of training samples and the sample label corresponding to each of the plurality of training samples, to obtain the plurality of behavior detection models, where the plurality of initial detection models correspond to the different phases of the track of the EK attack behavior.

Optionally, the obtaining a plurality of training samples includes obtaining a plurality of sample HTTP packet flow data, where the sample HTTP packet flow data is data in an HTTP packet that is in the second data flow and that is transmitted within reference duration before a current time, filtering each of the plurality of sample HTTP packet flow data according to the filter rule set, and determining a plurality of remaining sample HTTP packet flow data obtained through filtering as the plurality of training samples.

It should be noted that in this disclosure, the attack detection device may perform a preprocessing operation on the obtained HTTP packet based on a definition of a data flow and the reference duration, to obtain the plurality of training samples.

Optionally, training a plurality of initial detection models based on the plurality of training samples and the sample label corresponding to each of the plurality of training samples, to obtain the plurality of behavior detection models includes selecting one initial detection model from the plurality of initial detection models, and performing the following operations by using the selected initial detection model until the following operations has been performed for each of the plurality of behavior detection models determining, based on a sample HTTP packet included in each of the plurality of training samples, a sample feature set corresponding to the selected initial detection model, where the sample feature set includes a plurality of sample feature vectors that are in a one-to-one correspondence with the plurality of training samples, and separately typing the plurality of sample feature vectors into the selected initial detection model to train the selected initial detection model, so that an output of the selected initial detection model is a sample label corresponding to a corresponding training sample in the plurality of training samples to obtain one behavior detection model.

Optionally, after training a plurality of initial detection models based on the plurality of training samples and the sample label corresponding to each of the plurality of training samples, to obtain the plurality of behavior detection models, the method further includes determining a sample cross feature set based on the plurality of behavior detection models and a sample feature set corresponding to each of the plurality of behavior detection models, where the sample cross feature set includes a plurality of sample cross feature vectors that are in a one-to-one correspondence with the plurality of training samples, and separately typing the plurality of sample cross feature vectors into an initial analysis model to train the initial analysis model, so that an output of the initial analysis model is a sample label corresponding to a corresponding training sample in the plurality of training samples to obtain the association analysis model.

In this disclosure, because the plurality of behavior detection models is used to describe the different phases of the track of the EK attack behavior, sample feature vectors used to train the initial detection models are also different. The attack detection device may determine, based on sample HTTP packets included in the plurality of training samples and a behavior feature included in a feature vector corresponding to each behavior detection model, a sample feature set corresponding to a corresponding initial detection model.

Optionally, before determining a sample cross feature set based on the plurality of behavior detection models and a sample feature set corresponding to each of the plurality of behavior detection models, the method further includes separately performing vulnerability file detection and malware detection on the plurality of training samples, to obtain a vulnerability file detection result and a malware detection result that correspond to each of the plurality of training samples, and determining a sample cross feature set based on the plurality of behavior detection models and a sample feature set corresponding to each of the plurality of behavior detection models includes determining the sample cross feature set based on the plurality of behavior detection models, the sample feature set corresponding to each of the plurality of behavior detection models, and the vulnerability file detection result and the malware detection result that correspond to each of the plurality of training samples. In other words, the attack detection device may perform vulnerability file detection and malware detection on each training sample based on an IPS.

Optionally, determining the sample cross feature set based on the plurality of behavior detection models, the sample feature set corresponding to each of the plurality of behavior detection models, and the vulnerability file detection result and the malware detection result that correspond to each of the plurality of training samples includes selecting one training sample from the plurality of training samples, and performing the following processing on the selected training sample until each of the plurality of training samples is processed: separately typing sample feature vectors that are in sample feature sets corresponding to the plurality of behavior detection models and that correspond to the selected training sample into the plurality of behavior detection models, to obtain sample probability values separately output by the plurality of behavior detection models, so as to obtain a plurality of sample probability values, determining a plurality of sample cross features based on the plurality of sample probability values, and a vulnerability file detection result and a malware detection result that correspond to the selected training sample, where the sample cross feature is obtained by multiplying two pieces of different data in the plurality of sample probability values, and the vulnerability file detection result and the malware detection result that correspond to the selected training sample, and generating one sample cross feature vector based on the plurality of sample cross features.

It should be noted that, for an implementation of determining the plurality of sample cross features based on the plurality of sample probability values, and the vulnerability file detection result and the malware detection result that correspond to the selected training sample, reference may be made to the foregoing related descriptions of determining the plurality of cross features.

According to a second aspect, an attack behavior detection apparatus is provided. The attack behavior detection apparatus has a function of implementing the attack behavior detection method in the first aspect. The attack behavior detection apparatus includes one or more modules, and the one or more modules are configured to implement the attack behavior detection method provided in the first aspect.

In other words, this disclosure provides the attack behavior detection apparatus. The apparatus includes a first obtaining module configured to obtain HTTP packet flow data transmitted by a host within a reference time period, where the HTTP packet flow data includes data in one or more HTTP packets, the one or more HTTP packets belong to a first data flow, and the reference time period is a time period from which there is reference duration before a current time, a first determining module configured to determine a plurality of initial probability values based on the HTTP packet flow data by using a plurality of behavior detection models, where the plurality of behavior detection models are used to describe different phases of a track of an EK attack behavior, and the initial probability value is a probability value output by one of the plurality of behavior detection models, a second determining module configured to determine a comprehensive probability value based on the plurality of initial probability values, where the comprehensive probability value is used to indicate a possibility that the host is attacked by an EK in a process in which the host transmits the first data flow, and a third determining module configured to determine, if the comprehensive probability value is greater than a preset probability threshold, that the EK attack behavior exists in the process in which the host transmits the first data flow.

Optionally, the first determining module is further configured to select one behavior detection model from the plurality of behavior detection models, and perform the following operations by using the selected behavior detection model until the following operations has been performed for each of the plurality of behavior detection models: determining, based on the HTTP packet flow data, a feature vector corresponding to the selected behavior detection model, and typing the feature vector into the selected behavior detection model, to obtain an initial probability value output by the selected behavior detection model.

Optionally, the plurality of behavior detection models includes at least two of the following models: a redirection detection model, an attack object screening detection model, a vulnerability exploitation detection model, and a malware download detection model.

Optionally, the second determining module includes a first determining unit configured to determine a plurality of cross features based on the plurality of initial probability values, where the cross feature is obtained by multiplying two different initial probability values in the plurality of initial probability values, a generation unit configured to generate a cross feature vector based on the plurality of cross features, and a comprehensive analysis unit configured to type the cross feature vector into an association analysis model to obtain the comprehensive probability value output by the association analysis model, where the association analysis model is used to perform comprehensive analysis on the plurality of different phases of the track of the EK attack behavior.

Optionally, the second determining module further includes a second determining unit configured to perform vulnerability file detection and malware detection on the HTTP packet flow data to obtain a vulnerability file detection result and a malware detection result.

The first determining unit is further configured to determine the plurality of cross features based on the plurality of initial probability values, the vulnerability file detection result, and the malware detection result, where the cross feature is obtained by multiplying two pieces of different data in the plurality of initial probability values, the vulnerability file detection result, and the malware detection result.

Optionally, the first determining unit is further configured to generate a probability matrix based on the plurality of initial probability values, the vulnerability file detection result, and the malware detection result, where the probability matrix is a matrix of X rows and X columns, X is a total quantity of the plurality of initial probability values, the vulnerability file detection result, and the malware detection result, both the X rows and the X columns correspond to the plurality of initial probability values, the vulnerability file detection result, and the malware detection result, and an element in the probability matrix is obtained by multiplying two pieces of cross-connected data, and screen a plurality of elements from the probability matrix according to a cross feature selection policy, and use the plurality of screened elements as the plurality of cross features.

Optionally, the apparatus further includes a first filter unit configured to filter the HTTP packet flow data according to a filter rule set.

The first determining module is further configured to determine the plurality of initial probability values by using the plurality of behavior detection models based on remaining HTTP packet flow data obtained through filtering.

Optionally, the filter rule set includes but is not limited to the following rules.

A first filter rule: A match item of the first filter rule is a reference type set including a type or types of one or more operating systems. The reference type set includes a type of an operating system for which a probability of being attacked by an EK is less than a reference probability threshold. An action of the first filter rule is filtering out. The first filter rule is used to filter out data in a first destination HTTP packet. The first destination HTTP packet is an HTTP packet carrying an operating system whose type is included in the reference type set.

A second filter rule: A match item of the second filter rule is one or more intranet addresses. An action of the second filter rule is filtering out. The second filter rule is used to filter out data in a second destination HTTP packet. The second destination HTTP packet is an HTTP packet carrying a destination address which is the intranet address.

A third filter rule: A match item of the third filter rule is a reference domain name set including one or more domain names. The reference domain name set includes a domain name whose access frequency is greater than a frequency threshold. An action of the third filter rule is filtering out. The third filter rule is used to filter out data in a third destination HTTP packet. The third destination HTTP packet is an HTTP packet carrying a domain name included in the reference domain name set.

Optionally, the apparatus further includes a second obtaining module configured to obtain a plurality of training samples and a sample label corresponding to each of the plurality of training samples, where the training sample includes data in one or more sample HTTP packets belonging to a second data flow, the sample label is used to indicate whether a corresponding training sample is a positive training sample or a negative training sample, the positive training sample is HTTP packet flow data that is not attacked by an EK, and the negative training sample is HTTP packet flow data that is attacked by the EK, and a first training module configured to train a plurality of initial detection models based on the plurality of training samples and the sample label corresponding to each of the plurality of training samples, to obtain the plurality of behavior detection models, where the plurality of initial detection models correspond to the different phases of the track of the EK attack behavior.

Optionally, the second obtaining module includes an obtaining unit configured to obtain a plurality of pieces of sample HTTP packet flow data, where the sample HTTP packet flow data is data in an HTTP packet that is in the second data flow and that is transmitted within reference duration before a current time. a second filter unit configured to filter each of the plurality of pieces of sample HTTP packet flow data according to the filter rule set, and a third determining unit configured to determine a plurality of pieces of remaining sample HTTP packet flow data obtained through filtering as the plurality of training samples.

Optionally, the first training module is further configured to select one initial detection model from the plurality of initial detection models, and perform the following operations by using the selected initial detection model until the following operations has been performed for each of the plurality of behavior detection models: determining, based on a sample HTTP packet included in each of the plurality of training samples, a sample feature set corresponding to the selected initial detection model, where the sample feature set includes a plurality of sample feature vectors that are in a one-to-one correspondence with the plurality of training samples, and separately typing the plurality of sample feature vectors into the selected initial detection model to train the selected initial detection model, so that an output of the selected initial detection model is a sample label corresponding to a corresponding training sample in the plurality of training samples to obtain one behavior detection model.

Optionally, the apparatus further includes a second obtaining module configured to obtain a plurality of training samples and a sample label corresponding to each of the plurality of training samples, where the training sample includes data in one or more sample HTTP packets belonging to a second data flow, the sample label is used to indicate whether a corresponding training sample is a positive training sample or a negative training sample, the positive training sample is HTTP packet flow data that is not attacked by an EK, and the negative training sample is HTTP packet flow data that is attacked by the EK, a first training module configured to train a plurality of initial detection models based on the plurality of training samples and the sample label corresponding to each of the plurality of training samples, to obtain the plurality of behavior detection models, where the plurality of initial detection models correspond to the different phases of the track of the EK attack behavior, a third determining module configured to determine a sample cross feature set based on the plurality of behavior detection models and a sample feature set corresponding to each of the plurality of behavior detection models, where the sample cross feature set includes a plurality of sample cross feature vectors that are in a one-to-one correspondence with the plurality of training samples, and a second training module configured to separately type the plurality of sample cross feature vectors into an initial analysis model to train the initial analysis model, so that an output of the initial analysis model is a sample label corresponding to a corresponding training sample in the plurality of training samples to obtain the association analysis model.

Optionally, the apparatus further includes a fourth determining module configured to separately perform vulnerability file detection and malware detection on the plurality of training samples, to obtain a vulnerability file detection result and a malware detection result that correspond to each of the plurality of training samples.

The third determining module is configured to determine the sample cross feature set based on the plurality of behavior detection models, the sample feature set corresponding to each of the plurality of behavior detection models, and the vulnerability file detection result and the malware detection result that correspond to each of the plurality of training samples.

Optionally, the third determining module is further configured to select one training sample from the plurality of training samples, and perform the following processing on the selected training sample until each of the plurality of training samples is processed: separately typing sample feature vectors that are in sample feature sets corresponding to the plurality of behavior detection models and that correspond to the selected training sample into the plurality of behavior detection models, to obtain sample probability values separately output by the plurality of behavior detection models, so as to obtain a plurality of sample probability values, determining a plurality of sample cross features based on the plurality of sample probability values, and a vulnerability file detection result and a malware detection result that correspond to the selected training sample, where the sample cross feature is obtained by multiplying two pieces of different data in the plurality of sample probability values, and the vulnerability file detection result and the malware detection result that correspond to the selected training sample, and generating one sample cross feature vector based on the plurality of sample cross features.

According to a third aspect, an attack detection device is provided. The attack detection device includes a processor and a memory. The memory is configured to store a program for executing the attack behavior detection method according to the first aspect, and store data used to implement the attack behavior detection method according to the first aspect. The processor is configured to execute the program stored in the memory. The attack detection device may further include a communications bus, and the communications bus is configured to establish a connection between the processor and the memory.

According to a fourth aspect, a computer-readable storage medium is provided. The computer-readable storage medium stores instructions. When the instructions are run on a computer, the computer is enabled to perform the attack behavior detection method according to the first aspect.

According to a fifth aspect, a computer program product including instructions is provided. When the computer program product runs on a computer, the computer is enabled to perform the attack behavior detection method according to the first aspect.

Technical effects achieved in the second aspect, the third aspect, the fourth aspect, and the fifth aspect are similar to technical effects achieved by using corresponding technical means in the first aspect.

The technical solutions provided in this disclosure can bring at least the following beneficial effects.

The track of the EK attack behavior includes the plurality of different phases. According to this solution, the HTTP packet flow data is obtained from the host within the time period, and processed by using the plurality of behavior detection models to determine the plurality of initial probability values, where the plurality of behavior detection models are used to describe the plurality of different phases. Therefore, this solution can completely depict the track of the EK attack behavior. After the plurality of initial probability values are determined, comprehensive processing may be performed on the plurality of initial probability values to obtain the comprehensive probability value. Therefore, this solution can comprehensively analyze a behavior mode of the EK attack in each phase, and more accurately determine a probability that the host is attacked by the EK in the process in which the host transmits the data flow, that is, more accurately detect the EK attack behavior. It can be learned that this solution can quickly and accurately detect the EK attack behavior, and does not occupy quite a lot of resources of the host. In addition, the HTTP packet flow data obtained in this solution includes only regular data specified in a network protocol. Compared with a method in which script code is obtained and parsed, this solution has a very low risk of infringing user privacy.

DESCRIPTION OF EMBODIMENTS

To make the objectives, technical solutions, and advantages of this disclosure clearer, the following further describes implementations of this disclosure in detail with reference to the accompanying drawings.

Figure 1:
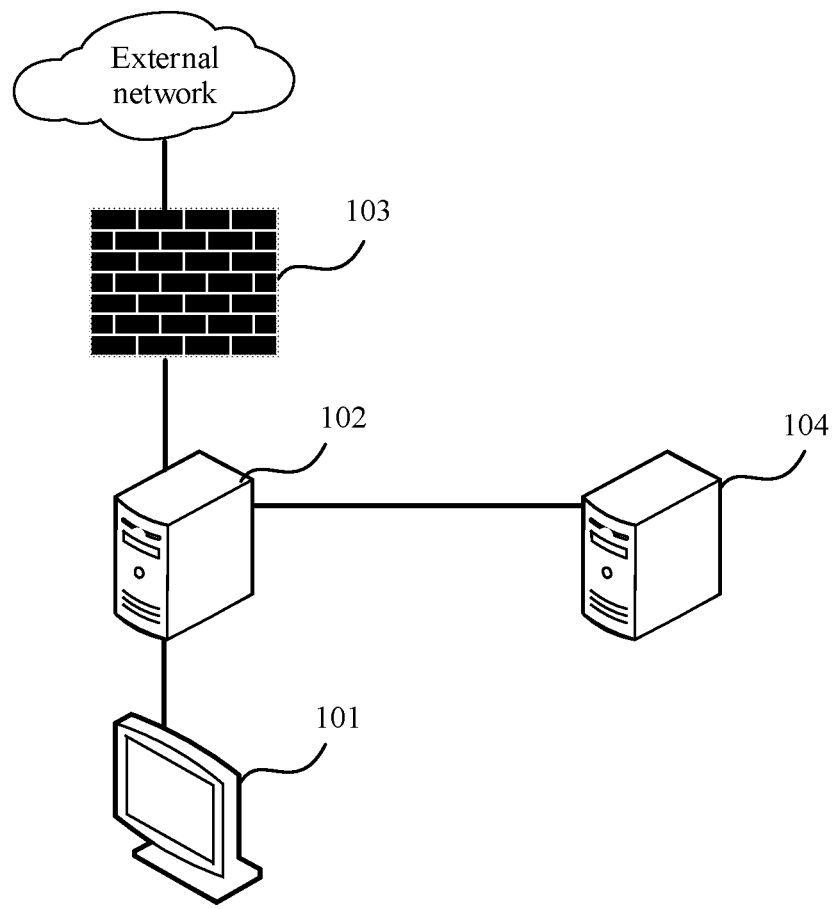
FIG. 1 is a diagram of a system architecture in an attack behavior detection method according to an embodiment of this disclosure.

FIG. 1 is a diagram of a system architecture in an attack behavior detection method according to an embodiment of this disclosure. Referring to FIG. 1, the system architecture includes a host 101, an HTTP proxy device 102, a firewall 103, and an attack detection device 104. The host 101 may communicate with the HTTP proxy device 102 through a wireless or wired connection. The HTTP proxy device 102 may communicate with the firewall 103 in a wireless or wired connection. The HTTP proxy device 102 may also communicate with the attack detection device 104 in a wireless or wired connection.

The host 101 is configured to transmit (i.e., receive or send) HTTP packet flow data. The HTTP proxy device 102 is configured to obtain some information on behalf of the host 101. In other words, after the HTTP packet flow data sent by the host 101 arrives at the HTTP proxy device 102, the HTTP proxy device 102 may obtain corresponding information from an external network and return the corresponding information to the host 101. The firewall 103 is configured to protect the host 101. The attack detection device 104 is configured to obtain, from the HTTP proxy device 102, HTTP packet flow data transmitted by the host 101 within a reference time period, and process the HTTP packet flow data by using the technical solutions provided in the embodiments of this disclosure, to determine whether the host 101 is attacked by an EK. The attack detection device 104 is further configured to determine a plurality of behavior detection models and an association analysis models that are provided in this solution, and deploy the plurality of behavior detection models and the association analysis model on the attack detection device 104.

Optionally, the attack detection device 104 is any third-party device. For example, the attack detection device 104 is a cybersecurity intelligence system (CIS), which is referred to as a CIS device for short.

In some other embodiments, the attack detection device 104 is a bypass device of a forwarding device, for example, a firewall, a switch, or a router. In this scenario, the system architecture includes the forwarding device, and the forwarding device is configured to forward the packet flow data transmitted by the host 101. The attack detection device 104 is configured to obtain, from the forwarding device, the HTTP packet flow data transmitted by the host 101.

In some other embodiments, the attack detection device 104 adopts a cloud deployment solution, that is, the attack detection device 104 is deployed on the internet. The attack detection device 104 provides an EK attack behavior detection service for another device that provides packet flow data. The device that provides packet flow data herein includes but is not limited to a host, a forwarding device for example, a firewall, a switch, or a router, or a third-party server. Optionally, the device that provides packet flow data provides the packet flow data for the attack detection device 104 in a website interface design (Web UI), and receives a detection result output by the attack detection device 104, for example, whether an EK attack behavior exists in the provided packet flow data.

Optionally, the plurality of behavior detection models and the association analysis model in this embodiment of this disclosure may alternatively be determined by another computer device through training based on training samples, as long as the plurality of trained behavior detection model and the trained association analysis model are deployed on the attack detection device 104.

Optionally, in this embodiment of this disclosure, the attack detection device 104 is further configured to send alarm information to the host 101 after determining that the host 101 is attacked by the EK. The alarm information is used to indicate that the host 101 is attacked by the EK, so as to indicate a user or the host 101 to take a response measure in time. Alternatively, the system architecture further includes a network management device. Both the host 101 and the attack detection device 104 may communicate with the network management device in a wireless or wired connection. The attack detection device 104 is further configured to report the alarm information to the network management device after determining that the host 101 is attacked by the EK. The network management device may take a response measure based on the reported alarm information, for example, forward the alarm information to the host 101.

In some other embodiments, the system architecture includes a plurality of hosts 101. The plurality of hosts 101 are located in a local area network, and the plurality of hosts 101 may communicate with the HTTP proxy device 102 in a wireless or wired manner. In this scenario, the attack detection device 104 is configured to detect whether the plurality of hosts 101 are attacked by the EK. In the scenario in which the system architecture further includes a forwarding device, the forwarding device may forward HTTP packet flow data transmitted by the plurality of hosts 101. The attack detection device 104 is configured to detect whether each of the plurality of hosts 101 is attacked by the EK.

Optionally, in this embodiment of this disclosure, any host 101 is a desktop computer, a tablet computer, a notebook computer, a mobile phone, a smart television, a smart speaker, or the like. This is not limited in this embodiment of this disclosure.

Figure 2:
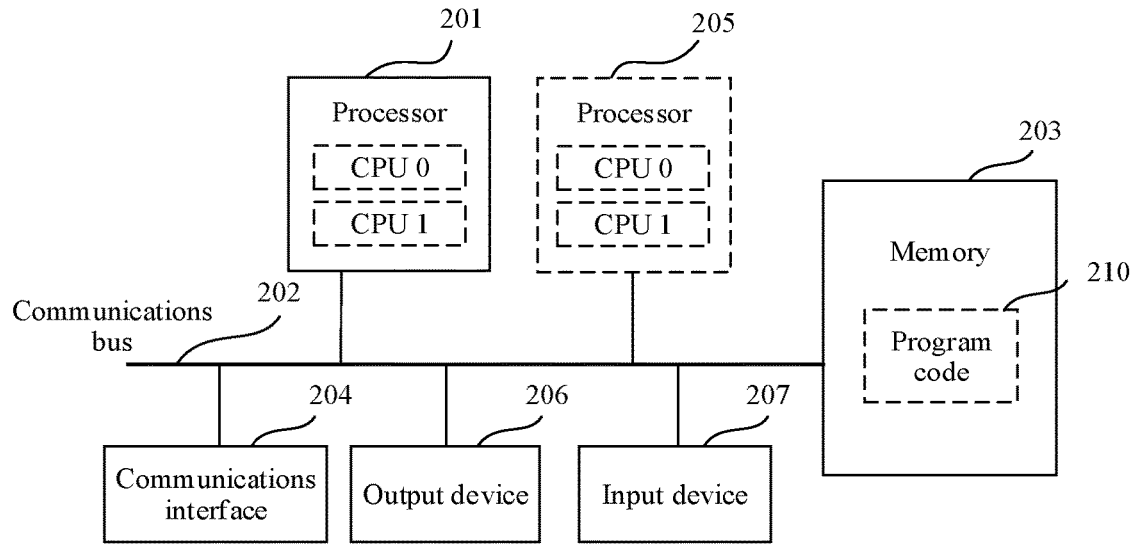
FIG. 2 is a schematic diagram of a structure of an attack detection device according to an embodiment of this disclosure.

FIG. 2 is a schematic diagram of a structure of an attack detection device according to an embodiment of this disclosure. Optionally, the attack detection device is the attack detection device 104 shown in FIG. 1. The attack detection device includes one or more processors 201, a communications bus 202, a memory 203, and one or more communications interfaces 204.

The processor 201 is a general purpose central processing unit (CPU), a network processor (NP), a microprocessor, or is one or more integrated circuits configured to implement the solutions of this disclosure, for example, an application-specific integrated circuit (ASIC), a programmable logic device (PLD), or a combination thereof. Optionally, the PLD is a complex PLD (CPLD), a field-programmable gate array (FPGA), a generic array logic (GAL), or any combination thereof.

The communications bus 202 is used to transmit information between the foregoing components. Optionally, the communications bus 202 may be classified as an address bus, a data bus, a control bus, and the like. For ease of representation, only one thick line is used to represent the bus in the figure, but this does not mean that there is only one bus or only one type of bus.

Optionally, the memory 203 is a read-only memory (ROM), a random-access memory (RAM), an electrically erasable programmable ROM (EEPROM), an optical disc (including a compact disc (CD) ROM (CD-ROM), a CD, a laser disc, a digital versatile disc (DVD), a BLU-RAY disc, or the like), a magnetic disk storage medium or another magnetic storage device, or any other medium that can be configured to carry or store expected program code in a form of an instruction or a data structure and that can be accessed by a computer. However, this does not constitute a limitation herein. The memory 203 exists independently, and is connected to the processor 201 through the communications bus 202, or the memory 203 is integrated with the processor 201.

The communications interface 204 is configured to communicate with another device or a communications network by using any apparatus such as a transceiver. The communications interface 204 includes a wired communications interface, or may optionally include a wireless communications interface. The wired communications interface is, for example, an Ethernet interface. Optionally, the Ethernet interface is an optical interface, an electrical interface, or a combination thereof. The wireless communications interface is a wireless local area network (WLAN) interface, a cellular network communications interface, a combination thereof, or the like.

Optionally, in some embodiments, the attack detection device includes a plurality of processors, such as the processor 201 and a processor 205 shown in FIG. 2. Each of the processors is a single-core processor, or is a multi-core processor. Optionally, the processor herein is one or more devices, circuits, and/or processing cores for processing data (such as computer program instructions).

During specific implementation, in an embodiment, the attack detection device may further include an output device 206 and an input device 207. The output device 206 communicates with the processor 201, and may display information in a plurality of manners. For example, the output device 206 is a liquid-crystal display (LCD), a light-emitting diode (LED) display device, a cathode-ray tube (CRT) display device, a projector, or a printer. The input device 207 communicates with the processor 201, and may receive an input from a user in a plurality of manners. For example, the input device 207 is a mouse, a keyboard, a touchscreen device, or a sensing device.

In some embodiments, the memory 203 is configured to store program code 210 for executing the solutions of this disclosure, and the processor 201 may execute the program code 210 stored in the memory 203. The program code includes one or more software modules, and the attack detection device may implement, by using the processor 201 and the program code 210 in the memory 203, an attack behavior detection method provided in the following embodiment in FIG. 3.

Figure 3:
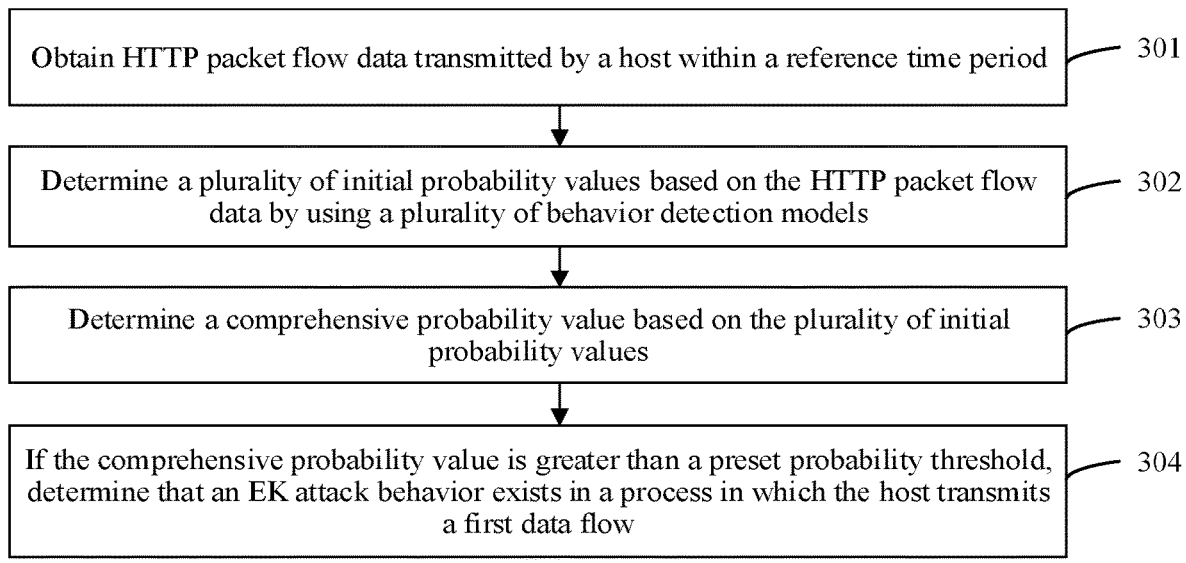
FIG. 3 is a flowchart of an attack behavior detection method according to an embodiment of this disclosure.

FIG. 3 is a flowchart of an attack behavior detection method according to an embodiment of this disclosure. The method is applied to an attack detection device. An example in which the attack detection device is the CIS device in FIG. 1 is used for description. Refer to FIG. 3. The method includes the following steps.

Step 301: Obtain HTTP packet flow data transmitted by a host within a reference time period.

In this embodiment of this disclosure, a track of an EK attack behavior includes a plurality of different phases. In a running process, the host transmits HTTP packet flow data (a data flow). The HTTP packet flow data transmitted by the host attacked by an EK carries some behavior features of the attack from the EK. Based on this, the attack detection device may obtain the HTTP packet flow data transmitted by the host within the reference time period, and then analyze and process the HTTP packet flow data, to detect whether the host is attacked by the EK, namely, to detect whether the EK attack behavior exists in the process in which the host transmits the data flow.

If the host is attacked by the EK, HTTP packets are continuously transmitted between the host and an EK attack device within a period of time. Therefore, in this solution, an HTTP packet flow data needs to be obtained within a period of time, namely, the HTTP packet flow data needs to be obtained within the reference time period. The HTTP packet flow data includes data in one or more HTTP packets, the one or more HTTP packets belong to a first data flow, and the first data flow is a data flow including HTTP packets transmitted between the host and a device. The reference time period is a time period from which there is reference duration before a current time. Optionally, the reference duration is preset duration, for example, 20 minutes or 30 minutes.

It should be noted that, a data flow is defined as a 2-tuple in this embodiment of this disclosure. The 2-tuple includes a source Internet Protocol (IP) address and a destination IP address. In other words, a plurality of HTTP packets with a same source IP address and a same destination IP address belong to a same data flow. Alternatively, a data flow is defined in any other manner. This is not limited in this embodiment of this disclosure.

In addition, an HTTP proxy device receives the HTTP packet flow data transmitted by the host. The attack detection device sends the HTTP proxy device an obtaining request for obtaining the HTTP packet data flow. The HTTP proxy device may send, to the attack detection device according to the obtaining request, the HTTP packet flow data transmitted by the host within the reference time period.

It should be noted that, in a scenario in which a system architecture includes only one host, the HTTP proxy device receives only HTTP packet flow data transmitted by the host, and the attack detection device may directly obtain, from the HTTP proxy device, the HTTP packet flow data transmitted by the host. In a scenario in which the system architecture includes a plurality of hosts, the HTTP proxy device is configured to serve the plurality of hosts. The HTTP proxy device receives HTTP packet flow data transmitted by each host, that is, the HTTP proxy device receives HTTP packet flow data from the plurality of hosts. The attack detection device is configured to detect whether each of the plurality of hosts is attacked by the EK. In this scenario, the attack detection device may obtain, in real time, an HTTP packet received by the HTTP proxy device, and process the obtained HTTP packet based on the definition of the data flow and the reference duration, to obtain HTTP packet flow data transmitted by each host within the reference time period. For the HTTP packet flow data from each host, the attack detection device may detect, by using the attack detection method provided in this embodiment of this disclosure, whether an EK attack behavior exists in a process in which a corresponding host transmits HTTP packet flow data.

Step 302: Determine a plurality of initial probability values based on the HTTP packet flow data by using a plurality of behavior detection models.

In this embodiment of this disclosure, the attack detection device may perform data preprocessing on the obtained HTTP packet flow data to obtain an input for each of the plurality of behavior detection models, and process the corresponding input by using the behavior detection model to obtain a corresponding initial probability value, so as to obtain the plurality of initial probability values. The plurality of behavior detection models is used to describe the different phases of the track of the EK attack behavior.

Optionally, the attack detection device may select one behavior detection model from the plurality of behavior detection models, and perform the following operations by using the selected behavior detection model until the following operations has been performed for each of the plurality of behavior detection models: determining, based on the HTTP packet flow data, a feature vector corresponding to the selected behavior detection model, and typing the feature vector into the selected behavior detection model to obtain an initial probability value output by the selected behavior detection model.

In this embodiment of this disclosure, the plurality of behavior detection models is used to describe the different phases of the track of the EK attack behavior, that is, one behavior detection model may be used to describe one phase of the track of the EK attack behavior, and behavior features of the EK attack behavior are different in different phases. Therefore, feature vectors typed into the behavior detection models are also different, that is, feature vectors that correspond to the behavior detection models and that are determined based on the HTTP packet flow data from the host are also different.

Optionally, the plurality of behavior detection models includes at least two of the following models: a redirection detection model, an attack object screening detection model, a vulnerability exploitation detection model, and a malware download detection model.

In this embodiment of this disclosure, the track of the EK attack behavior includes the phases such as a redirection phase, an attack object screening phase, a vulnerability exploitation phase, and a malware download phase. Based on this, the plurality of behavior detection models may be used to describe at least any two of the four phases, that is, the plurality of behavior detection models includes at least two models used to describe any two of the four phases respectively.

The redirection detection model is used to describe the redirection phase of the track of the EK attack behavior. In this phase, an EK attack redirects a web page or the like currently browsed by a user. The attack object screening detection model is used to describe the attack object screening phase of the track of the EK attack behavior. In this phase, the EK screens an attack object based on information such as an operating system and a browser version carried in an HTTP packet transmitted by the host. The vulnerability exploitation detection model is used to describe the vulnerability exploitation phase of the track of the EK attack behavior. In this phase, the EK analyzes a vulnerability on the host and downloads a vulnerability file to the host. For example, a flash plug-in of an earlier version on the host may have a vulnerability. The EK downloads a flash vulnerability file to the host, performs a brute-force attack on the host, and the like. The malware download detection model is used to describe the malware download phase of the track of the EK attack behavior. In this phase, the EK downloads malware such as Trojan horse software and ransomware to the host.

Optionally, the behavior detection model in this embodiment of this disclosure is a learning model based on a machine learning algorithm, for example, a learning model based on a random forest algorithm, a learning model based on a support vector machine (SVM) algorithm, or a learning model based on an eXtreme Gradient Boosting (XGBoost) algorithm. Algorithms used in the behavior detection models may be the same or different. This is not limited in this embodiment of this disclosure. For example, both a behavior detection model A and a behavior detection model B are learning models based on the random forest algorithm. Alternatively, a behavior detection model A is a learning model based on the random forest algorithm, and a behavior detection model B is a learning model based on the SVM algorithm.

In this embodiment of this disclosure, the attack detection device may obtain, from the HTTP packet flow data, one or more features included in a feature vector corresponding to each behavior detection model. In addition, data in one HTTP packet includes a plurality of fields, each field represents a type of information, and all features included in a feature vector may be separately obtained from these fields.

It should be noted that a plurality of behavior features of the EK attack behavior may be classified as a public feature and a private feature. The public feature is a feature common to each behavior detection model, or a feature common to some behavior detection models. The private feature is a feature private to a behavior detection model. In other words, the feature vector corresponding to each behavior detection model includes one or more features, and some of the one or more features are public features, and the others are private features.

For the redirection detection model, because the redirection detection model is used to describe the redirection phase of the track of the EK attack behavior, an HTTP packet transmitted by the host may carry a location field. The location field is used to redirect a web page browsed through the host. Based on this, a feature vector corresponding to the redirection detection model includes a behavior feature in the redirection phase, for example, a feature such as an HTTP packet message code, a length of a URL field, or whether a location field is carried. The HTTP packet message code is a public feature of the redirection detection model and the vulnerability exploitation detection model. The length of the URL field is a public feature of the foregoing four models. Whether the HTTP packet flow data carries a location field is a private feature of the redirection detection model.

Optionally, the HTTP packet flow data includes the data in the one or more HTTP packets. Therefore, the HTTP packet message code may be a message code vector determined based on message code carried in data in each HTTP packet, and the message code is of a type such as 200, 400, 404, or the like. The length of the URL field is a total length, an average length, or a maximum length of all URL fields carried in the data in the one or more HTTP packets. In addition, as long as data in one HTTP packet carries a location field, it is determined that the HTTP packet flow data carries the location field. Optionally, '0' is used to indicate that the location field is not carried, and '1' is used to indicate that the location field is carried, or another character code is used for such indication. This is not limited in this embodiment of this disclosure.

In this embodiment of this disclosure, the message code vector may be determined through one-hot coding. Assuming that the message code used in this embodiment of this disclosure includes a type 1, a type 2, and a type 3, the message code vector may be initialized to '0, 0, 0'. That is, a total quantity of elements in the initialized message code vector is equal to a total quantity of used message code types. Each element corresponds to one type, and is initialized to '0'. If the one or more message codes include the type 1 and the type 2 but do not include the type 3, it may be determined that the message code vector is '1, 1, 0'.

For example, it is assumed that the message code used in this embodiment of this disclosure includes 400 and 302, the HTTP packet flow data includes data in three packets: an HTTP 1, an HTTP 2, and an HTTP 3, message code carried in the three packets is 200, 400, and 404, an average length of all URL fields carried in the data in the three packets is 60, and the data in the packet HTTP 1 carries a location field. In this case, a feature vector of the HTTP packet flow data is [0, 1, 60, 1].

For the attack object screening detection model, the attack object screening detection model is used to describe the attack object screening phase of the track of the EK attack behavior. Based on this, a feature vector corresponding to the attack object screening detection model includes a behavior feature in the attack object screening phase, for example, a length of a URL field, or a type of an operating system. Optionally, the type of the operating system is a private feature of the attack object screening detection model.

For the vulnerability exploitation detection model, the vulnerability exploitation detection model is used to describe the vulnerability exploitation phase of the track of the EK attack behavior, and a field in an HTTP packet transmitted by the host in this phase may be changed, including adding a field, tampering with data, encrypting a field, or the like. Based on this, a feature vector corresponding to the vulnerability exploitation detection model includes a behavior feature in the vulnerability exploitation phase, for example, an HTTP packet message code, a length of a URL field, whether a URL field includes a Base64-encoded substring, or whether an X-flash-version field is carried. Optionally, whether the URL field includes the Base64-encoded substring and whether the X-flash-version field is carried are private features of the vulnerability exploitation detection model.

It should be noted that if a URL field includes a Base64-encoded substring, it indicates that the URL is encrypted and the host may be currently attacked by the EK. As long as a URL field in one HTTP packet includes a Base64-encoded substring, it is determined that the URL field in the HTTP packet flow data includes the Base64-encoded substring. Likewise, as long as one HTTP packet carries an X-flash-version field, it is determined that the HTTP packet flow data includes the X-flash-version field.

For the malware download detection model, the malware download detection model is used to describe the malware download phase of the track of the EK attack behavior. Based on this, a feature vector corresponding to the malware download detection model includes a behavior feature in the malware download phase, for example, an HTTP packet message code, a length of a URL field, a content-type field in an HTTP packet, or a content-length field in an HTTP packet. It should be noted that an HTTP packet includes an HTTP request packet and an HTTP response packet, and the HTTP response packet carries a content-type field and a content-length field.

The feature included in the feature vector corresponding to each model described above may be extended according to an actual situation. For example, the feature may include whether some special characters or special fields are included, a quantity of fields included in an HTTP packet header, and a length of a field included in the packet header. Optionally, the quantity of fields included in the HTTP packet header is the largest quantity of fields included in one or more packet header or packet headers of the one or more HTTP packets. The length of the field included in the packet header is an average length of all fields included in the HTTP packet header. Which feature is a public feature or a private feature may be specified in advance.

The following uses an example in which the plurality of behavior detection models includes the four models as an example to describe the obtained feature vector corresponding to each model. For ease of description, in the features described above, the HTTP packet message code is denoted as $X1$, the length of the URL field is denoted as $X2$, whether the location field is carried is denoted as $X3$, whether the URL field includes the Base64-encoded sub string is denoted as $X4$, whether the X-flash-version field is carried is denoted as $X5$, and the type of the operating system is denoted as $X6$. The feature vector corresponding to the redirection detection model is [$X1, X2, X3$], the feature vector corresponding to the attack object screening detection model is [$X1, X2, X6$], the feature vector corresponding to the vulnerability exploitation detection model is [$X1, X2, X4, X5$], and the feature vector corresponding to the malware download detection model is [$X1, X2$].

After determining a feature vector corresponding to one model, the attack detection device types the feature vector into the corresponding model, and uses a probability value output by the model as an initial probability value. The attack detection device performs this operation on all the four models to obtain four initial probability values, which are denoted as $E1, E2, E3$, and $E4$, respectively.

Optionally, before determining the plurality of initial probability values based on the HTTP packet flow data from the host by using the plurality of behavior detection models, the attack detection device may filter the obtained HTTP packet flow data according to a filter rule set, to filter out data in an HTTP packet that does not need to be detected. Then, the attack detection device may determine the plurality of initial probability values by using the plurality of behavior detection models based on remaining HTTP packet flow data obtained through filtering.

In this embodiment of this disclosure, the filter rule set includes but is not limited to the following rules.

A first filter rule: A match item of the first filter rule includes that a type of an operating system is included in a reference type set. The reference type set includes a type of an operating system for which a probability of being attacked by an EK is less than a reference probability threshold. An action of the first filter rule is filtering out. The first filter rule is used to filter out data in a first destination HTTP packet. The first destination HTTP packet is an HTTP packet carrying an operating system whose type is included in the reference type set. A second filter rule: A match item of the second filter rule includes that a destination address is an intranet address. An action of the second filter rule is filtering out. The second filter rule is used to filter out data in a second destination HTTP packet. The second destination HTTP packet is an HTTP packet carrying a destination address which is the intranet address.

A third filter rule: A match item of the third filter rule includes that a domain name is included in a reference domain name set. The reference domain name set includes a domain name whose access frequency is greater than a frequency threshold. An action of the third filter rule is filtering out. The third filter rule is used to filter out data in a third destination HTTP packet. The third destination HTTP packet is an HTTP packet carrying a domain name included in the reference domain name set.

In other words, after obtaining the HTTP packet flow data transmitted by the host within the reference time period, the attack detection device may filter out data in an HTTP packet carrying the operating system whose type is a low-risk operating system, data in an HTTP packet carrying the destination address which is the intranet address, and/or data in an HTTP packet carrying the domain name which is a domain name with high access frequency.

It should be noted that a user-agent field carried in the data in the HTTP packet includes a type of an operating system, and the attack detection device may obtain the type of the operating system carried in the field. Optionally, each rule included in the filter rule set is set based on experience or set based on statistical data. The filter rule set may be dynamically extended according to a principle of minimizing unnecessary data processing on a premise that an HTTP packet suspiciously attacked by the EK is not missed. In addition, if the filter rule set includes a plurality of rules, when determining to filter data in an HTTP packet according to the rules, the attack detection device may determine a filter sequence based on importance of the rules, or determine any sequence as a filter sequence.

Figure 4:
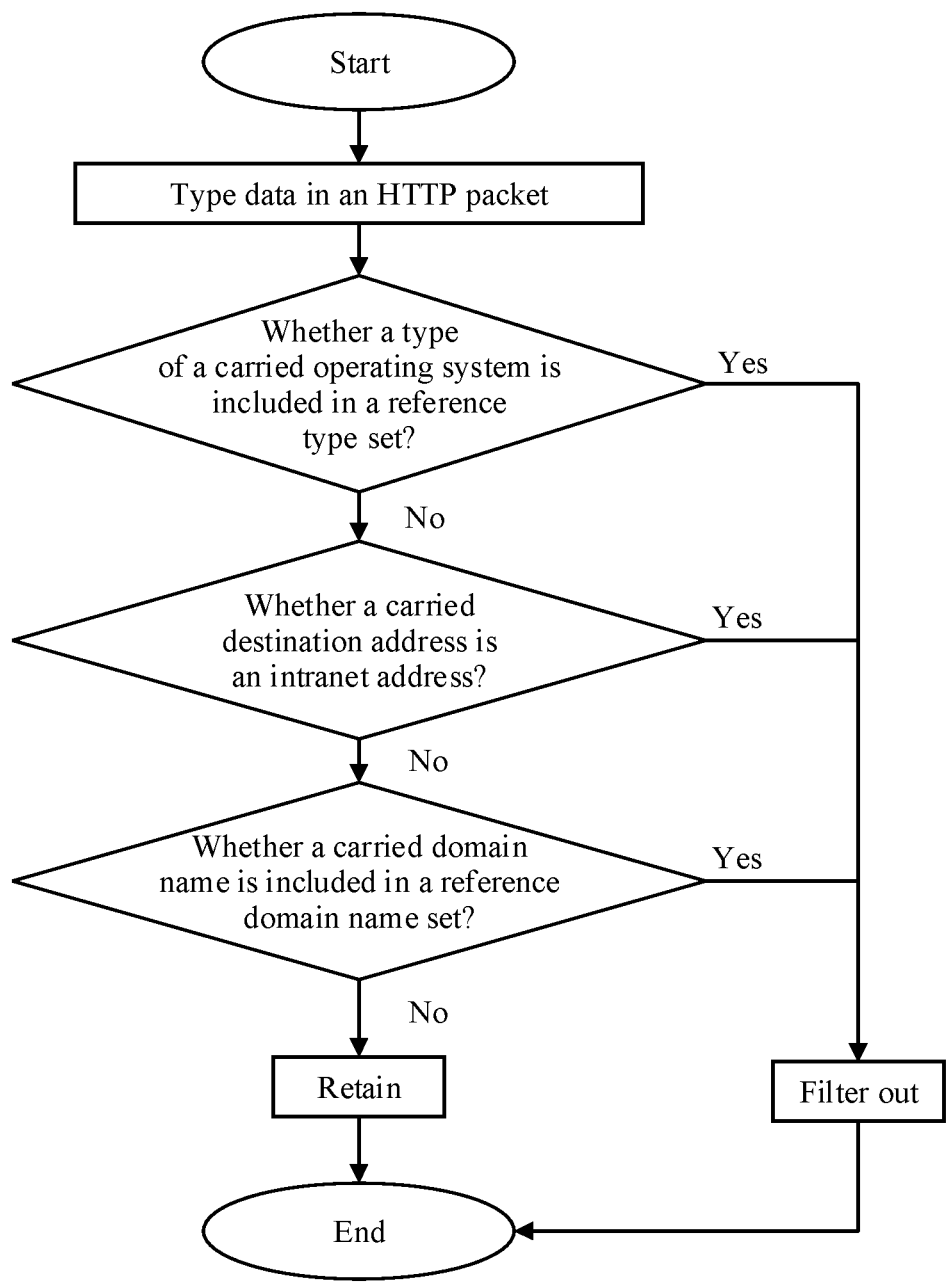
FIG. 4 is a flowchart of screening HTTP packet flow data according to a filter rule set according to an embodiment of this disclosure.

For example, it is assumed that the filter rule set includes the first filter rule, the second filter rule, and the third filter rule, and a filter sequence is the first filter rule, the second filter rule, and the third filter rule. Refer to FIG. 4. The attack detection device may first determine whether a type of an operating system carried in data in an HTTP packet is included in a reference type set. If the type of the operating system carried in the data in the HTTP packet is included in the reference type set, the attack detection device filters out the data in the HTTP packet, or if the type of the operating system carried in the data in the HTTP packet is not included in the reference type set, the attack detection device determines whether a destination address carried in the data in the HTTP packet is an intranet address. If the destination address carried in the data in the HTTP packet is the intranet address, the attack detection device filters out the data in the HTTP packet, or if the destination address carried in the data in the HTTP packet is not the intranet address, the attack detection device determines whether a domain name carried in the data in the HTTP packet is included in a reference domain name set. If the domain name carried in the data in the HTTP packet is included in the reference domain name set, the attack detection device filters out the data in the HTTP packet, or if the domain name carried in the data in the HTTP packet is not included in the reference domain name set, the attack detection device retains the data in the HTTP packet.

It should be noted that, for an implementation in which the attack detection device determines the plurality of initial probability values based on the filtered HTTP packet flow data by using the plurality of behavior detection models after filtering the HTTP packet flow data, reference may be made to the foregoing related descriptions. Details are not described herein again.

Step 303: Determine a comprehensive probability value based on the plurality of initial probability values.

In this embodiment of this disclosure, whether the EK attack behavior exists cannot be determined based on only one single initial probability value, that is, a single factor usually has a relatively low association with the EK. Therefore, after the plurality of initial probability values is determined by using the plurality of behavior detection models, the attack detection device may perform comprehensive processing on the plurality of initial probability values to determine the comprehensive probability value. The comprehensive probability value is used to indicate a possibility that the host is attacked by the EK in the process in which the host transmits the first data flow.

Optionally, the attack detection device may determine a plurality of cross features based on the plurality of initial probability values, where the cross feature is obtained by multiplying two different initial probability values in the plurality of initial probability values. The attack detection device may generate a cross feature vector based on the plurality of cross features, and type the cross feature vector into an association analysis model to obtain the comprehensive probability value output by the association analysis model, where the association analysis model is used to perform comprehensive analysis on the plurality of different phases of the track of the EK attack behavior.

Optionally, the association analysis model is any trained machine learning model, for example, a logistic regression model or a random forest model.

For example, the plurality of initial probability values includes E1, E2, E3, and E4, and the plurality of cross features include $F_{12}$, $F_{13}$, $F_{14}$, $F_{23}$, $F_{24}$, and $F_{34}$ in the following Table 1. The cross feature vector is [$F_{12}$, $F_{13}$, $F_{14}$, $F_{23}$, $F_{24}$, $F_{34}$], [$F_{12}$, $F_{13}$, $F_{14}$, $F_{23}$, $F_{34}$, $F_{24}$], or the like. That is, a sequence of elements in the cross feature vector is any defined sequence. The attack detection device may type the cross feature vector into the association analysis model to obtain an output comprehensive probability value P.

TABLE 1

|    | E1 | E2       | E3       | E4       |
|----|----|----------|----------|----------|
| E1 | x  | $F_{12}$ | $F_{13}$ | $F_{14}$ |
| E2 | x  | x        | $F_{23}$ | $F_{24}$ |
| E3 | x  | x        | x        | $F_{34}$ |
| E4 | x  | x        | x        | x        |

In addition, in addition to the foregoing described manner of determining the comprehensive probability value by using the association analysis model, in some other embodiments, the attack detection device may alternatively perform weighted calculation on the plurality of initial probability values to obtain the comprehensive probability value.

Optionally, before determining the plurality of cross features based on the plurality of initial probability values, the attack detection device may further perform vulnerability file detection and malware detection on the obtained HTTP packet flow data, to obtain a vulnerability file detection result and a malware detection result.

Optionally, a method for performing vulnerability file detection and malware detection on the HTTP packet flow data is a method for performing detection based on an IPS. The IPS may analyze a field and a character included in the HTTP packet flow data to obtain the vulnerability file detection result and the malware detection result. The vulnerability file detection result and the malware detection result each are 0 or 1. The vulnerability file detection result 0 indicates that a vulnerability file is not downloaded. The vulnerability file detection result 1 indicates that a vulnerability file is downloaded. The malware detection result 0 indicates that malware is not downloaded. The malware detection result 1 indicates that malware is downloaded. For ease of description, the vulnerability file detection result and the malware detection result are denoted as E5 and E6 respectively in the following.

After obtaining the plurality of initial probability values, the vulnerability file detection result, and the malware detection result, the attack detection device may determine the plurality of cross features based on the plurality of initial probability values, the vulnerability file detection result, and the malware detection result. The cross feature is obtained by multiplying two pieces of different data in the plurality of initial probability values, the vulnerability file detection result, and the malware detection result.

For example, it is assumed that the plurality of initial probability values include E1, E2, E3, and E4, and the vulnerability file detection result and the malware detection result are denoted as E5 and E6 respectively. Cross features include $F_{12}$, $F_{13}$, $F_{14}$, $F_{15}$, $F_{16}$, $F_{23}$, $F_{24}$, $F_{25}$, $F_{26}$, $F_{34}$, $F_{35}$, $F_{36}$, $F_{45}$, $F_{46}$, and $F_{47}$ in the following Table 2, and there are a total of 15 cross features.

TABLE 2

$$\begin{array}{c|cccccc} & E1 & E2 & E3 & E4 & E5 & E6 \\ \hline E1 & x & F_{12} & F_{13} & F_{14} & F_{15} & F_{16} \\ E2 & x & x & F_{23} & F_{24} & F_{25} & F_{26} \\ E3 & x & x & x & F_{34} & F_{35} & F_{36} \\ E4 & x & x & x & x & F_{45} & F_{46} \\ E5 & x & x & x & x & x & F_{56} \\ E6 & x & x & x & x & x & x \end{array}$$

If data obtained by multiplying two pieces of different data in the plurality of initial probability values, the vulnerability file detection result, and the malware detection result is used as one cross feature, a relatively large quantity of cross features may be obtained. Some of the cross features are redundant features. These cross features can be ignored in improvement of attack behavior detection accuracy, and can be removed to reduce calculation workloads. Based on this, the attack detection device may generate a probability matrix based on the plurality of initial probability values, the vulnerability file detection result, and the malware detection result, then screen a plurality of elements from the probability matrix according to a cross feature selection policy, and use the plurality of screened elements as the plurality of cross features. The probability matrix is a matrix of X rows and X columns, where X is a total quantity of the plurality of initial probability values, the vulnerability file detection result, the malware detection result, both the X rows and the X columns correspond to the plurality of initial probability values, the vulnerability file detection result, and the malware detection result, and an element in the probability matrix is obtained by multiplying two pieces of cross-connected data.

Optionally, in this embodiment of this disclosure, the cross feature selection policy is a policy determined based on experience, and is used to filter out a redundant feature.

For example, it is assumed that a plurality of initial probability values is probability values E1, E2, E3, and E4 output by the redirection detection model, the attack object screening detection model, the vulnerability exploitation detection model, and the malware download detection model respectively, and a vulnerability file detection result and a malware detection result are E5 and E6 respectively. In this case, a generated probability matrix D is shown in Table 3.

TABLE 3

$$\begin{array}{c|cccccc} & E1 & E2 & E3 & E4 & E5 & E6 \\ \hline E1 & x & x & F_{13} & F_{14} & F_{15} & F_{16} \\ E2 & x & x & F_{23} & F_{24} & F_{25} & F_{26} \\ E3 & x & x & x & F_{34} & F_{35} & F_{36} \\ E4 & x & x & x & x & F_{45} & F_{46} \\ E5 & x & x & x & x & x & F_{56} \\ E6 & x & x & x & x & x & x \end{array} = D$$

The probability matrix D is a matrix of six rows and six columns, that is, X is equal to 6. Elements x in the probability matrix D are redundant features, and the redundant features include a feature obtained by multiplying same data, and a feature that is determined based on experience and that can be ignored in improvement of attack detection accuracy. Elements $F_{13}$, $F_{14}$, ..., $F_{56}$ are the plurality of cross features obtained through screening according to the cross feature selection policy.

After obtaining the plurality of cross features through screening according to the cross feature selection policy, the attack detection device may generate the cross feature vector based on the foregoing related descriptions, and type the cross feature vector into the association analysis model to output the comprehensive probability value. For example, the cross feature vector is $[F_{13}, F_{14}, \ldots, F_{56}]$.

Step 304: If the comprehensive probability value is greater than a preset probability threshold, determine that the EK attack behavior exists in the process in which the host transmits the first data flow.

In this embodiment of this disclosure, if the comprehensive probability value is greater than the preset probability threshold, the attack detection device determines that the EK attack behavior exists in the process in which the host transmits the first data flow, that is, the host is attacked by the EK.

For example, it is assumed that the preset probability threshold is 90%. If the comprehensive probability value is 98%, the attack detection device determines that the EK attack behavior exists in the process in which the host transmits the first data flow, that is, the host is attacked by the EK. If the comprehensive probability value is 60%, the attack detection device determines that the EK attack behavior does not exist in the process in which the host transmits the first data flow, that is, the host is not attacked by the EK within the reference time period.

Figure 5:
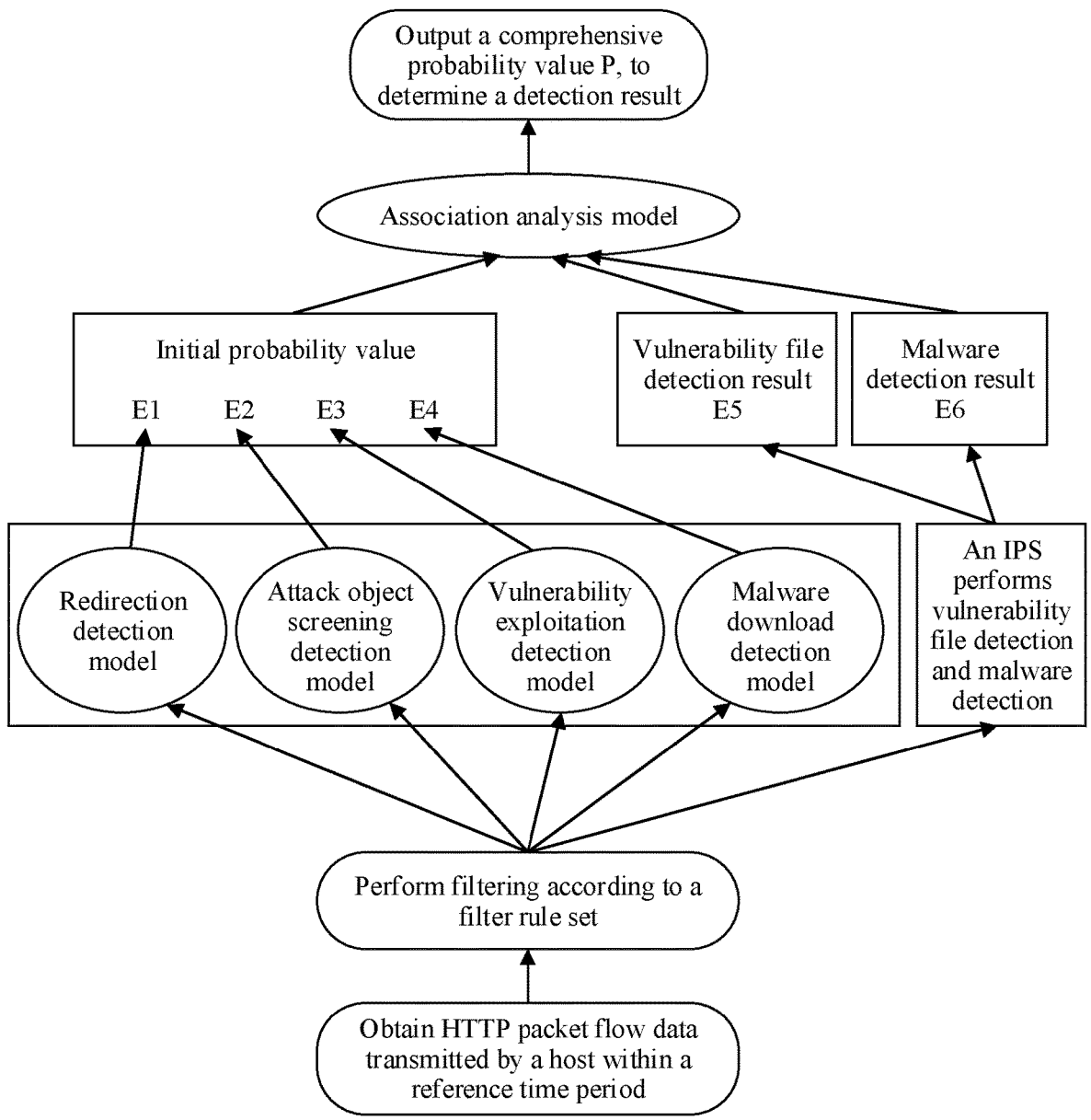
FIG. 5 is a flowchart of another attack behavior detection method according to an embodiment of this disclosure.

FIG. 5 is a flowchart of another attack behavior detection method according to an embodiment of this disclosure. Refer to FIG. 5. An attack detection device may obtain HTTP packet flow data transmitted by a host within a reference time period, and filter out, according to a filter rule set, data in an HTTP packet that does not need to be detected. The attack detection device separately types remaining HTTP packet flow data obtained through filtering into a redirection detection model, an attack object screening detection model, a vulnerability exploitation detection model, and a malware download detection model, and processes the HTTP packet flow data by using the four models to obtain initial probability values E1, E2, E3, and E4. In addition, the attack detection device may type the remaining HTTP packet flow data obtained through filtering into an IPS to obtain a vulnerability file detection result E5 and a malware detection result E6 after IPS detection. Then, the attack detection device types the four initial probability values, the vulnerability file detection result, and the malware detection result into an association analysis model, and determines a detection result based on a comprehensive probability value P output by the association analysis model. If the comprehensive probability value P is greater than a preset probability threshold, the detection result is that the host is determined to be attacked by an EK within the reference time period, or if the comprehensive probability value P does not exceed the preset probability threshold, the detection result is that the host is determined not to be attacked by an EK within the reference time period.

Optionally, in this embodiment of this disclosure, after determining that an EK attack behavior exists in a process in which the host transmits a first data flow, the attack detection device may report the detection result to a network management device. The network management device may take a response measure based on the detection result.

Figure 6:
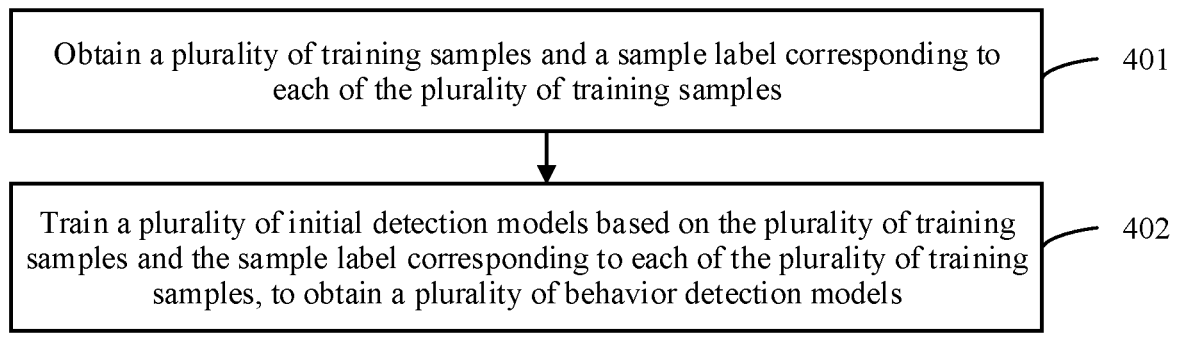
FIG. 6 is a flowchart of a method for determining a plurality of behavior detection models according to an embodiment of this disclosure.

The foregoing describes the method in which the attack detection device determines, by using the plurality of behavior detection models, whether the EK attack behavior exists in the process in which the host transmits the first data flow in this embodiment of this disclosure. Optionally, the plurality of attack behavior detection models is a plurality of models determined in advance based on training samples. The following describes a method for determining a plurality of attack behavior detection models provided in an embodiment of this disclosure. The method is applied to an attack detection device or is applied to another computer device. The following describes the method by using an example in which the method is applied to the attack detection device. To be specific, before a first probability value set including a plurality of first probability values is determined based on HTTP packet flow data by using the plurality of behavior detection models, as shown in FIG. 6, the attack behavior detection method further includes step 401 and step 402.

Step 401: Obtain a plurality of training samples and a sample label corresponding to each of the plurality of training samples.

In this embodiment of this disclosure, the attack detection device may obtain, from an HTTP proxy device, HTTP packets transmitted by hosts that produce samples in a network, to determine the plurality of training samples. The training sample includes data in one or more sample HTTP packets belonging to a second data flow. The sample label is used to indicate whether a corresponding training sample is a positive training sample or a negative training sample. The positive training sample is HTTP packet flow data that is not attacked by an EK. The negative training sample is HTTP packet flow data that is attacked by the EK. It should be noted that second data flows to which different training samples belong may be the same or different.

Optionally, the attack detection device may obtain a plurality of pieces of sample HTTP packet flow data, where the sample HTTP packet flow data is data in an HTTP packet that is in the second data flow and that is transmitted within reference duration before a current time. Then, the attack detection device may filter each of the plurality of sample HTTP packet flow data according to a filter rule set, and determine a plurality of pieces of remaining sample HTTP packet flow data obtained through filtering as the plurality of training samples.

In this embodiment of this disclosure, the attack detection device may perform a preprocessing operation on the obtained HTTP packet based on a definition of a data flow and the reference duration, to obtain the plurality of training samples.

For example, the attack detection device performs the preprocessing operation on the obtained HTTP packet, and may obtain the following event list. Sample HTTP packet flow data in each row in Table 4 is a training sample.

TABLE 4

| Reference duration | Source IP address | Destination IP address | Sample HTTP packet flow data |
|---|---|---|---|
| T1 | 10.0.xx.xx | 10.xx.xx.xx | [HTTP 1, HTTP 2, . . . , HTTP n] |
| T1 | 10.1.xx.xx | 10.xx.xx.xx | [HTTP 1, HTTP 2, . . . , HTTP m] |
| T1 | . . . | . . . | . . . |
| T1 | 10.xx.xx.xx | 10.xx.xx.xx | [HTTP 1, HTTP 2, . . . , HTTP k] |

It should be noted that T1 in Table 4 represents the reference duration, the data flow is defined as a 2-tuple, and each sample HTTP packet flow data includes data in one or more sample HTTP packets. The data in the one or more sample HTTP packets may be sequentially arranged in order of transmission time. The attack detection device may filter, according to the filter rule set described above, the data in the one or more sample HTTP packets included in each sample HTTP packet flow data, and use sample HTTP packet flow data obtained through filtering as the plurality of training samples.

In addition, the attack detection device may determine, according to an actual situation, whether each training sample is a positive training sample or a negative training sample, to determine a sample label corresponding to each training sample. The positive sample label may be indicated by '1', and the negative training sample may be indicated by '0'. The negative training sample may be known HTTP packet flow data that is attacked by the EK, and includes real data and/or simulation data. The simulation data is HTTP packet flow data generated by simulating the EK attack behavior.

Step 402: Train a plurality of initial detection models based on the plurality of training samples and the sample label corresponding to each of the plurality of training samples, to obtain the plurality of behavior detection models.

In this embodiment of this disclosure, after obtaining the plurality of training samples and the sample label corresponding to each training sample, the attack detection device may separately train each of the plurality of initial detection models, to obtain the plurality of behavior detection models. The plurality of initial detection models corresponds to different phases of a track of the EK attack behavior, that is, the initial detection models are selected based on behavior features in the different phases of the track of the EK attack behavior.

The attack detection device may select one initial detection model from the plurality of initial detection models, and perform the following operations by using the selected initial detection model until the following operations has been performed for each of the plurality of behavior detection models determining, based on a sample HTTP packet included in each of the plurality of training samples, a sample feature set corresponding to the selected initial detection model, where the sample feature set includes a plurality of sample feature vectors that are in a one-to-one correspondence with the plurality of training samples, and separately typing the plurality of sample feature vectors into the selected initial detection model to train the selected initial detection model, so that an output of the selected initial detection model is a sample label corresponding to a corresponding training sample in the plurality of training samples to obtain one behavior detection model.

In this embodiment of this disclosure, because the plurality of behavior detection models is used to describe the different phases of the track of the EK attack behavior, sample feature vectors used to train the initial detection models are also different. The attack detection device may determine, based on sample HTTP packets included in the plurality of training samples and a behavior feature included in a feature vector corresponding to each behavior detection model, a sample feature set corresponding to a corresponding initial detection model.

For example, the plurality of behavior detection models still include a redirection detection model, an attack object screening detection model, a vulnerability exploitation detection model, and a malware download detection model, a feature vector corresponding to the redirection detection model is [X1, X2, X3], a feature vector corresponding to the attack object screening detection model may be [X1, X2, X6], a feature vector corresponding to the vulnerability exploitation detection model may be [X1, X2, X4, X5], and a feature vector corresponding to the malware download detection model may be [X1, X2]. The redirection detection model is used as an example, a sample feature set corresponding to an initial detection model corresponding to the redirection detection model may be as follows:

$$\begin{Bmatrix} [X1_{11}, X2_{12}, X3_{13}], \\ [X1_{21}, X2_{22}, X3_{23}], \\ ... \\ [X1_{n1}, X2_{n2}, X3_{n3}] \end{Bmatrix},$$

where n represents a total quantity of sample feature vectors included in the sample feature set.

After determining the sample feature set corresponding to the selected initial detection model, the attack detection device may separately type the plurality of sample feature vectors included in the sample feature set into the selected initial detection model to train the selected initial detection model, so that the output of the selected initial detection model is the sample label corresponding to the corresponding training sample in the plurality of training samples. In other words, a process of training the plurality of initial detection models is a supervised learning process in this embodiment of this disclosure.

Figure 7:
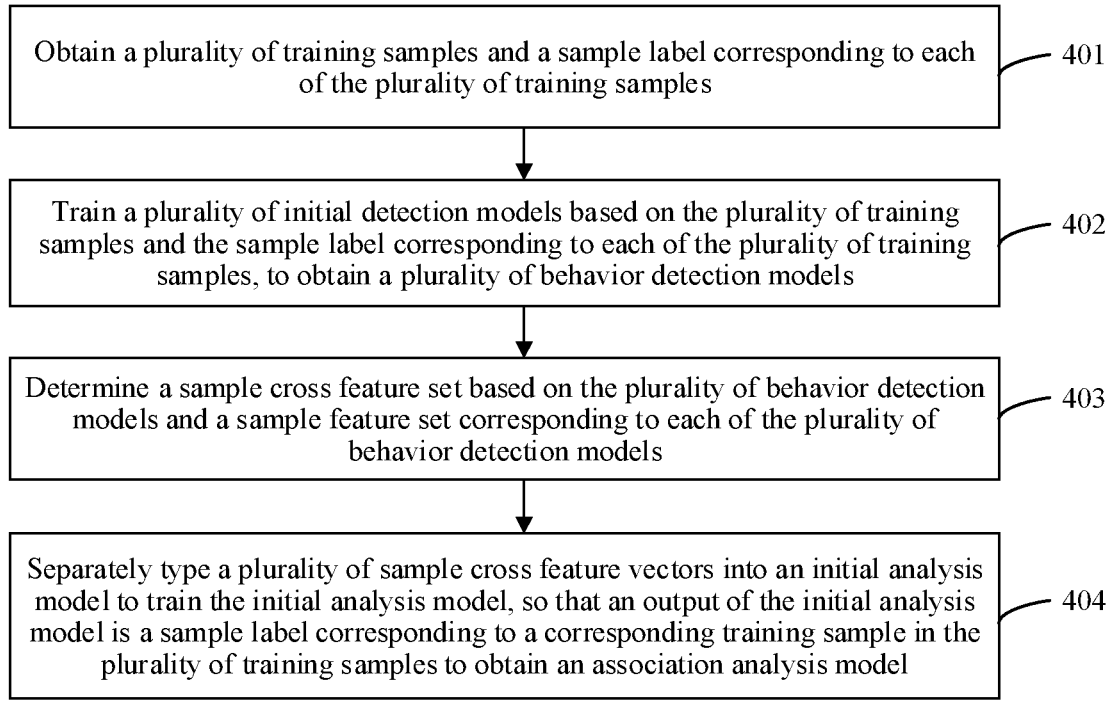
FIG. 7 is a flowchart of a method for determining an association analysis model according to an embodiment of this disclosure.

The association analysis model in the attack detection model is also a model determined in advance based on training samples. After the plurality of behavior detection models are obtained, as shown in FIG. 7, the attack behavior detection method further includes step 403 and step 404.

Step 403: Determine a sample cross feature set based on the plurality of behavior detection models and a sample feature set corresponding to each of the plurality of behavior detection models.

In this embodiment of this disclosure, after determining the plurality of behavior detection models, the attack detection device may select one training sample from the plurality of training samples, and perform the following processing on the selected training samples until each of the plurality of training samples is processed: separately typing sample feature vectors that are in sample feature sets corresponding to the plurality of behavior detection models and that correspond to the selected training sample into the plurality of behavior detection models, to obtain sample probability values separately output by the plurality of behavior detection models, so as to obtain a plurality of sample probability values, determining a plurality of sample cross features based on the plurality of sample probability values, where the sample cross feature is obtained by multiplying two pieces of different data in the plurality of sample probability values, and generating one sample cross feature vector based on the plurality of sample cross features.

After performing the foregoing processing, the attack detection device may determine the sample cross feature set based on the plurality of sample cross feature vectors that are in a one-to-one correspondence with the plurality of training samples, that is, the sample cross feature set includes the plurality of sample cross feature vectors that are in a one-to-one correspondence with the plurality of training samples.

Optionally, in this embodiment of this disclosure, the attack detection device may further separately perform vulnerability file detection and malware detection on the plurality of training samples, to obtain a vulnerability file detection result and a malware detection result corresponding to each of the plurality of training samples. Then, the attack detection device may determine the sample cross feature set based on the plurality of behavior detection models, the sample feature set corresponding to each of the plurality of behavior detection models, and the vulnerability file detection result and the malware detection result that correspond to each of the plurality of training samples.

It should be noted that the attack detection device may perform vulnerability file detection and malware detection on each training sample based on an IPS in this embodiment of this disclosure.

It should be noted that, for an implementation of determining the plurality of sample cross features based on the plurality of sample probability values, and the vulnerability file detection result and the malware detection result that correspond to the selected training sample, reference may be made to the foregoing related descriptions of determining the plurality of cross features.

Step 404: Separately typing the plurality of sample cross feature vectors into an initial analysis model to train the initial analysis model, so that an output of the initial analysis model is a sample label corresponding to a corresponding training sample in the plurality of training samples to obtain the association analysis model.

In this embodiment of this disclosure, after determining the plurality of sample cross feature vectors, the attack detection device may type the plurality of sample cross feature vectors into the initial analysis model to train the initial analysis model, so that the output of the initial analysis model is the sample label corresponding to the corresponding training sample in the plurality of training samples and the association analysis model is obtained. In other words, a process of obtaining the association analysis model through training is a supervised learning process in this embodiment of this disclosure.

Optionally, the association analysis model is a model determined by using any machine learning algorithm. This is not limited in this embodiment of this disclosure. If the association analysis model is a logistic regression model, after being obtained through training, the model may be used to obtain a weight corresponding to each sample cross feature in the sample cross feature vector. The weight is used to represent importance of each cross feature. If the attack detection device subsequently determines, based on the association analysis model, that the host is attacked by the EK, a reason for determining that the host is attacked by the EK may be added to alarm information.

In conclusion, in this embodiment of this disclosure, the track of the EK attack behavior includes the plurality of different phases. According to this solution, the HTTP packet flow data can be obtained from the host within the time period, and processed by using the plurality of behavior detection models to determine the plurality of initial probability values, where the plurality of behavior detection models are used to describe the plurality of different phases. Therefore, this solution can completely depict the track of the EK attack behavior. After the plurality of initial probability values are determined, comprehensive processing may be performed on the plurality of initial probability values to obtain the comprehensive probability value. Therefore, this solution can comprehensively analyze a behavior mode of the EK attack in each phase, and more accurately determine a probability that the host is attacked by the EK in the process in which the host transmits the data flow, that is, more accurately detect the EK attack behavior. It can be learned that this solution can quickly and accurately detect the EK attack behavior, and does not occupy quite a lot of resources of the host. In addition, the HTTP packet flow data obtained in this solution includes only regular data specified in a network protocol. Compared with a method in which script code is obtained and parsed, this solution has a very low risk of infringing user privacy.

Figure 8:
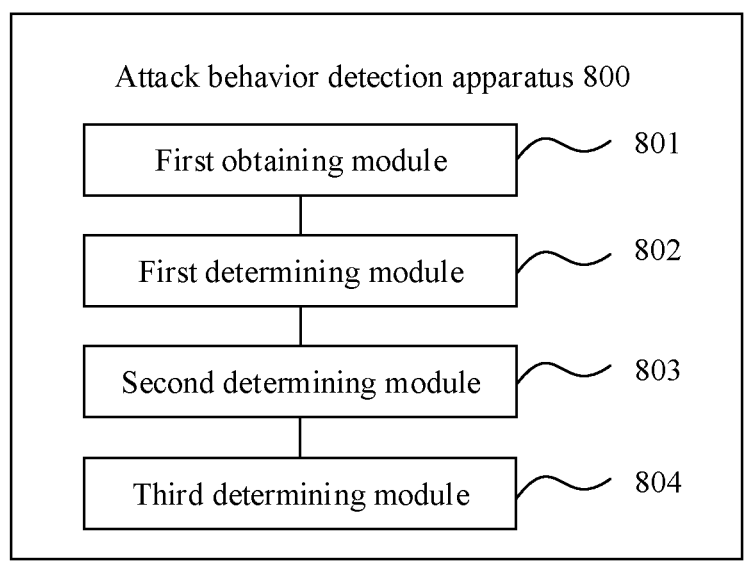
FIG. 8 is a schematic diagram of a structure of an attack behavior detection apparatus according to an embodiment of this disclosure.

FIG. 8 is a schematic diagram of a structure of an attack behavior detection apparatus according to an embodiment of this disclosure. The attack behavior detection apparatus 800 may be implemented by software, hardware, or a combination of software and hardware to become a part or entirety of an attack detection device. The attack detection device may be the attack detection device shown in FIG. 1. Referring to FIG. 8, the apparatus includes a first obtaining module 801, a first determining module 802, a second determining module 803, and a third determining module 804.

The first obtaining module 801 is configured to obtain HTTP packet flow data transmitted by a host within a reference time period, where the HTTP packet flow data includes data in one or more HTTP packets, the one or more HTTP packets belong to a first data flow, and the reference time period is a time period from which there is reference duration before a current time.

The first determining module 802 is configured to determine a plurality of initial probability values based on the HTTP packet flow data by using a plurality of behavior detection models, where the plurality of behavior detection models is used to describe different phases of a track of an EK attack behavior, and the initial probability value is a probability value output by one of the plurality of behavior detection models.

The second determining module 803 is configured to determine a comprehensive probability value based on the plurality of initial probability values, where the comprehensive probability value is used to indicate a possibility that the host is attacked by an EK in a process in which the host transmits the first data flow.

The third determining module 804 is configured to determine, if the comprehensive probability value is greater than a preset probability threshold, that the EK attack behavior exists in the process in which the host transmits the first data flow.

Optionally, the first determining module 802 is further configured to select one behavior detection model from the plurality of behavior detection models, and perform the following operations by using the selected behavior detection model until the following operations has been performed for each of the plurality of behavior detection models: determining, based on the HTTP packet flow data, a feature vector corresponding to the selected behavior detection model, and typing the feature vector into the selected behavior detection model, to obtain an initial probability value output by the selected behavior detection model.

Optionally, the plurality of behavior detection models includes at least two of the following models: a redirection detection model, an attack object screening detection model, a vulnerability exploitation detection model, and a malware download detection model.

Optionally, the second determining module 803 includes a first determining unit configured to determine a plurality of cross features based on the plurality of initial probability values, where the cross feature is obtained by multiplying two different initial probability values in the plurality of initial probability values, a generation unit configured to generate a cross feature vector based on the plurality of cross features, and a comprehensive analysis unit configured to type the cross feature vector into an association analysis model to obtain the comprehensive probability value output by the association analysis model, where the association analysis model is used to perform comprehensive analysis on the plurality of different phases of the track of the EK attack behavior.

Optionally, the second determining module 803 further includes a second determining unit configured to perform vulnerability file detection and malware detection on the HTTP packet flow data to obtain a vulnerability file detection result and a malware detection result.

The first determining unit is further configured to determine the plurality of cross features based on the plurality of initial probability values, the vulnerability file detection result, and the malware detection result, where the cross feature is obtained by multiplying two pieces of different data in the plurality of initial probability values, the vulnerability file detection result, and the malware detection result.

Optionally, the first determining unit is further configured to generate a probability matrix based on the plurality of initial probability values, the vulnerability file detection result, and the malware detection result, where the probability matrix is a matrix of X rows and X columns, X is a total quantity of the plurality of initial probability values, the vulnerability file detection result, and the malware detection result, both the X rows and the X columns correspond to the plurality of initial probability values, the vulnerability file detection result, and the malware detection result, and an element in the probability matrix is obtained by multiplying two pieces of cross-connected data, and screen a plurality of elements from the probability matrix according to a cross feature selection policy, and use the plurality of screened elements as the plurality of cross features.

Optionally, the apparatus 800 further includes a first filter unit configured to filter the HTTP packet flow data according to a filter rule set.

The first determining module is further configured to determine the plurality of initial probability values by using the plurality of behavior detection models based on remaining HTTP packet flow data obtained through filtering.

Optionally, the filter rule set includes but is not limited to the following rules.

A first filter rule: A match item of the first filter rule is a reference type set including a type or types of one or more operating systems. The reference type set includes a type of an operating system for which a probability of being attacked by an EK is less than a reference probability threshold. An action of the first filter rule is filtering out. The first filter rule is used to filter out data in a first destination HTTP packet. The first destination HTTP packet is an HTTP packet carrying an operating system whose type is included in the reference type set.

A second filter rule: A match item of the second filter rule is one or more intranet addresses. An action of the second filter rule is filtering out. The second filter rule is used to filter out data in a second destination HTTP packet. The second destination HTTP packet is an HTTP packet carrying a destination address which is the intranet address.

A third filter rule: A match item of the third filter rule is a reference domain name set including one or more domain names. The reference domain name set includes a domain name whose access frequency is greater than a frequency threshold. An action of the third filter rule is filtering out. The third filter rule is used to filter out data in a third destination HTTP packet. The third destination HTTP packet is an HTTP packet carrying a domain name included in the reference domain name set.

Optionally, the apparatus 800 further includes a second obtaining module configured to obtain a plurality of training samples and a sample label corresponding to each of the plurality of training samples, where the training sample includes data in one or more sample HTTP packets belonging to a second data flow, the sample label is used to indicate whether a corresponding training sample is a positive training sample or a negative training sample, the positive training sample is HTTP packet flow data that is not attacked by an EK, and the negative training sample is HTTP packet flow data that is attacked by the EK, and a first training module configured to train a plurality of initial detection models based on the plurality of training samples and the sample label corresponding to each of the plurality of training samples, to obtain the plurality of behavior detection models, where the plurality of initial detection models correspond to the different phases of the track of the EK attack behavior.

Optionally, the second obtaining module includes an obtaining unit configured to obtain a plurality of pieces of sample HTTP packet flow data, where the sample HTTP packet flow data is data in an HTTP packet that is in the second data flow and that is transmitted within reference duration before a current time. a second filter unit configured to filter each of the plurality of pieces of sample HTTP packet flow data according to the filter rule set, and a third determining unit configured to determine a plurality of pieces of remaining sample HTTP packet flow data obtained through filtering as the plurality of training samples.

Optionally, the first training module is further configured to select one initial detection model from the plurality of initial detection models, and perform the following operations by using the selected initial detection model until the following operations has been performed for each of the plurality of behavior detection models: determining, based on a sample HTTP packet included in each of the plurality of training samples, a sample feature set corresponding to the selected initial detection model, where the sample feature set includes a plurality of sample feature vectors that are in a one-to-one correspondence with the plurality of training samples, and separately typing the plurality of sample feature vectors into the selected initial detection model to train the selected initial detection model, so that an output of the selected initial detection model is a sample label corresponding to a corresponding training sample in the plurality of training samples to obtain one behavior detection model.

Optionally, the apparatus 800 further includes a second obtaining module configured to obtain a plurality of training samples and a sample label corresponding to each of the plurality of training samples, where the training sample includes data in one or more sample HTTP packets belonging to a second data flow, the sample label is used to indicate whether a corresponding training sample is a positive training sample or a negative training sample, the positive training sample is HTTP packet flow data that is not attacked by an EK, and the negative training sample is HTTP packet flow data that is attacked by the EK, a first training module configured to train a plurality of initial detection models based on the plurality of training samples and the sample label corresponding to each of the plurality of training samples, to obtain the plurality of behavior detection models, where the plurality of initial detection models correspond to the different phases of the track of the EK attack behavior, a third determining module configured to determine a sample cross feature set based on the plurality of behavior detection models and a sample feature set corresponding to each of the plurality of behavior detection models, where the sample cross feature set includes a plurality of sample cross feature vectors that are in a one-to-one correspondence with the plurality of training samples, and a second training module configured to separately type the plurality of sample cross feature vectors into an initial analysis model to train the initial analysis model, so that an output of the initial analysis model is a sample label corresponding to a corresponding training sample in the plurality of training samples to obtain the association analysis model.

Optionally, the apparatus 800 further includes a fourth determining module configured to separately perform vulnerability file detection and malware detection on the plurality of training samples, to obtain a vulnerability file detection result and a malware detection result that correspond to each of the plurality of training samples.

The third determining module is configured to determine the sample cross feature set based on the plurality of behavior detection models, the sample feature set corresponding to each of the plurality of behavior detection models, and the vulnerability file detection result and the malware detection result that correspond to each of the plurality of training samples.

Optionally, the third determining module is further configured to select one training sample from the plurality of training samples, and perform the following processing on the selected training sample until each of the plurality of training samples is processed: separately typing sample feature vectors that are in sample feature sets corresponding to the plurality of behavior detection models and that correspond to the selected training sample into the plurality of behavior detection models, to obtain sample probability values separately output by the plurality of behavior detection models, so as to obtain a plurality of sample probability values, determining a plurality of sample cross features based on the plurality of sample probability values, and a vulnerability file detection result and a malware detection result that correspond to the selected training sample, where the sample cross feature is obtained by multiplying two pieces of different data in the plurality of sample probability values, and the vulnerability file detection result and the malware detection result that correspond to the selected training sample, and generating one sample cross feature vector based on the plurality of sample cross features.

In conclusion, in this embodiment of this disclosure, the track of the EK attack behavior includes the plurality of different phases. According to this solution, the HTTP packet flow data can be obtained from the host within the time period, and processed by using the plurality of behavior detection models to determine the plurality of initial probability values, where the plurality of behavior detection models are used to describe the plurality of different phases. Therefore, this solution can completely depict the track of the EK attack behavior. After the plurality of initial probability values are determined, comprehensive processing may be performed on the plurality of initial probability values to obtain the comprehensive probability value. Therefore, this solution can comprehensively analyze a behavior mode of the EK attack in each phase, and more accurately determine a probability that the host is attacked by the EK in the process in which the host transmits the data flow, that is, more accurately detect the EK attack behavior. It can be learned that this solution can quickly and accurately detect the EK attack behavior, and does not occupy quite a lot of resources of the host. In addition, the HTTP packet flow data obtained in this solution includes only regular data specified in a network protocol. Compared with a method in which script code is obtained and parsed, this solution has a very low risk of infringing user privacy.

It should be noted that when the attack behavior detection apparatus provided by the foregoing embodiment detects an attack behavior, division into the foregoing function modules is used as an example only. During an actual application, the foregoing function allocation can be completed by different function modules according to a requirement, that is, the internal structure of the apparatus is divided into different function modules to perform all or some of the foregoing functions. In addition, the attack behavior detection apparatus provided in the foregoing embodiment belongs to a same concept as the embodiment of the attack behavior detection method. For a specific implementation process, refer to the method embodiment. Details are not described herein again.

All or some of the foregoing embodiments may be implemented through software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedures or the functions according to the embodiments of this disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD, a semiconductor medium (for example, a solid-state drive (SSD)), or the like. It should be noted that the computer-readable storage medium mentioned in this disclosure may be a non-volatile storage medium. In other words, the computer-readable storage medium may be a non-transitory storage medium.

The foregoing descriptions are merely embodiments of this disclosure, but are not intended to limit this disclosure. Any modification, equivalent replacement, or improvement made by a person skilled in the art based on descriptions of the embodiments of this disclosure should fall within the protection scope of this application.

What is claimed is:

1. A method comprising:
obtaining, from a host within a reference time period, first Hypertext Transfer Protocol (HTTP) packet flow data comprising first data in one or more HTTP packets, wherein the one or more HTTP packets belong to a first data flow, and wherein the reference time period is a reference duration before a current time;
determining, based on the first HTTP packet flow data and using a plurality of first behavior detection models, a plurality of first initial probability values, wherein the first behavior detection models describe different phases of a track of an exploit kit (EK) attack behavior, and wherein each of the first initial probability values is output by one of the first behavior detection models;
determining, based on the first initial probability values, a comprehensive probability value indicating a probability that the host is attacked by an EK in a process in which the host transmits the first data flow; and
determining that the EK attack behavior exists in the process when the comprehensive probability value is greater than a preset probability threshold.

2. The method of claim 1, further comprising:
selecting a second behavior detection model from the plurality of first behavior detection models;
determining, for each of the first behavior detection models, using the second behavior detection model, and based on the first HTTP packet flow data, a feature vector corresponding to the second behavior detection model; and
inputting the feature vector into the second behavior detection model to obtain a second initial probability value output by the second behavior detection model.

3. The method of claim 1, further comprising:
determining, based on the first initial probability values, a plurality of cross features, wherein each of the cross features is based on a first multiplication of two different initial probability values in the first initial probability values;
generating, based on the cross features, a cross feature vector; and
inputting the cross feature vector into an association analysis model to obtain the comprehensive probability value, wherein the association analysis model performs a comprehensive analysis on the different phases.

4. The method of claim 3, wherein before determining the cross features, the method further comprises:
performing a vulnerability file detection on the first HTTP packet flow data to obtain a vulnerability file detection result;
performing a malware detection on the first HTTP packet flow data to obtain a malware detection result; and
further determining, based on the vulnerability file detection result and the malware detection result, the cross features, wherein each of the cross features is based on a second multiplication of two pieces of different data in the first initial probability values, the vulnerability file detection result, and the malware detection result.

5. The method of claim 4, further comprising:
generating, based on the first initial probability values, the vulnerability file detection result, and the malware detection result, a probability matrix of X rows and X columns, wherein X is a total quantity of the first initial probability values, the vulnerability file detection result, and the malware detection result, wherein both the X rows and the X columns correspond to the first initial probability values, the vulnerability file detection result, and the malware detection result, and wherein a first element in the probability matrix is based on a third multiplication of two pieces of cross-connected data;
screening, according to a cross feature selection policy, a plurality of second elements from the probability matrix; and
setting the second elements as the cross features.

6. The method of claim 3, wherein before determining the first initial probability values, the method further comprises:
obtaining a plurality of training samples and a sample label corresponding to each of the training samples, wherein each of the training samples comprises second data in one or more sample HTTP packets of a second data flow, wherein the sample label indicates whether a corresponding training sample is a positive training sample or a negative training sample, wherein the positive training sample is second HTTP packet flow data that is not attacked by the EK, and wherein the negative training sample is third HTTP packet flow data that is attacked by the EK;
training, based on the training samples and the sample label, a plurality of initial detection models to obtain the first behavior detection models, wherein the initial detection models correspond to the different phases;
determining, based on the first behavior detection models and a sample feature set corresponding to each of the first behavior detection models, a sample cross feature set comprising a plurality of sample cross feature vectors that are in a one-to-one correspondence with the training samples; and
separately inputting the sample cross feature vectors into an initial analysis model to obtain the association analysis model.

7. The method of claim 6, wherein before determining the sample cross feature set, the method further comprises:
performing a vulnerability file detection on the training samples to obtain a vulnerability file detection result;
performing a malware detection on the training samples to obtain a malware detection result that correspond to each of the training samples; and
further determining, based on the vulnerability file detection result and the malware detection result, the sample cross feature set.

8. The method of claim 7, further comprising:
selecting a second training sample from the training samples;
separately inputting, for each of the training samples, sample feature vectors that are in sample feature sets corresponding to the first behavior detection models and that correspond to the second training sample into the first behavior detection models to obtain a plurality of sample probability values;
determining, for each of the training samples and based on the sample probability values, a second vulnerability file detection result that correspond to the second training sample, and a second malware detection result that correspond to the second training sample, a plurality of sample cross features, wherein each of the sample cross features is based on a fourth multiplication of two pieces of different data in the sample probability values, the second vulnerability file detection result, and the second malware detection result; and
generating, based on the sample cross features, a second sample cross feature vector.

9. The method of claim 1, wherein before determining the first initial probability values, the method further comprises:
obtaining a plurality of training samples and a sample label corresponding to each of the training samples, wherein each of the training samples comprises second data in one or more sample HTTP packets of a second data flow, wherein the sample label indicates whether a corresponding training sample is a positive training sample or a negative training sample, wherein the positive training sample is second HTTP packet flow data that is not attacked by the EK, and wherein the negative training sample is third HTTP packet flow data that is attacked by the EK; and
training, based on the training samples and the sample label, a plurality of first initial detection models to obtain the first behavior detection models, wherein the first initial detection models correspond to the different phases.

10. The method of claim 9, further comprising:
selecting a second initial detection model from the first initial detection models;
determining, for each of the first behavior detection models, using the second initial detection model, and based on a second sample HTTP packet comprised in each of the training samples, a sample feature set corresponding to the second initial detection model, wherein the sample feature set comprises a plurality of sample feature vectors that are in a one-to-one correspondence with the training samples; and
separately inputting, for each of the first behavior detection models and using the second initial detection model, the sample feature vectors into the second initial detection model to train the second initial detection model to obtain a second sample label corresponding to a second training sample in the training samples to obtain a second behavior detection model in the first behavior detection models.

11. An apparatus comprising:
a processor; and
a memory coupled to the processor and configured to store instructions, wherein when executed by the processor, the instructions cause the apparatus to:
obtain, from a host within a reference time period, first Hypertext Transfer Protocol (HTTP) packet flow data comprising first data in one or more HTTP packets, wherein the one or more HTTP packets belong to a first data flow, and the reference time period is a reference duration before a current time;
determine, based on the HTTP packet flow data and using a plurality of first behavior detection models, a plurality of first initial probability values, wherein the first behavior detection models describe different phases of a track of an exploit kit (EK) attack behavior, and wherein each of the first initial probability values is output by one of the first behavior detection models;

determine, based on the first initial probability values, a comprehensive probability value indicating a probability that the host is attacked by an EK in a process in which the host transmits the first data flow; and determine that the EK attack behavior exists in the process when the comprehensive probability value is greater than a preset probability threshold.

12. The apparatus of claim 11, wherein when executed by the processor, the instructions further cause the apparatus to:

select a second behavior detection model from the first behavior detection models;

determine, for each of the first behavior detection models, using the second behavior detection model, and based on the HTTP packet flow data, a feature vector corresponding to the second behavior detection model; and input, for each of the first behavior detection models and using the second behavior detection model, the feature vector into the second behavior detection model to obtain a second initial probability value output by the second behavior detection model.

13. The apparatus of claim 11, wherein when executed by the processor, the instructions further cause the apparatus to:

determine, based on the first initial probability values, a plurality of cross features, wherein each of the cross features is based on a first multiplication of two different initial probability values in the first initial probability values;

generate, based on the cross features, a cross feature vector; and input the cross feature vector into an association analysis model to obtain the comprehensive probability value, wherein the association analysis model performs a comprehensive analysis on the different phases.

14. The apparatus of claim 13, wherein when executed by the processor, the instructions further cause the apparatus to:

perform a vulnerability file detection on the first HTTP packet flow data to obtain a vulnerability file detection result;

perform a malware detection on the first HTTP packet flow data to obtain a malware detection result; and further determine, based on the vulnerability file detection result and the malware detection result, the cross features, wherein each of the cross features is based on a second multiplication of two pieces of different data in the first initial probability values, the vulnerability file detection result, and the malware detection result.

15. The apparatus of claim 14, wherein when executed by the processor, the instructions further cause the apparatus to:

generate, based on the first initial probability values, the vulnerability file detection result, and the malware detection result, a probability matrix of X rows and X columns, wherein X is a total quantity of the first initial probability values, the vulnerability file detection result, and the malware detection result, wherein both the X rows and the X columns correspond to the first initial probability values, the vulnerability file detection result, and the malware detection result, and wherein a first element in the probability matrix is based on a third multiplication of two pieces of cross-connected data;

screen, according to a cross feature selection policy, a plurality of second elements from the probability matrix; and set the second elements as the cross features.

16. The apparatus of claim 13, wherein when executed by the processor, the instructions further cause the apparatus to:

obtain a plurality of training samples and a sample label corresponding to each of the training samples, wherein each of the training samples comprises second data in one or more sample HTTP packets of a second data flow, wherein the sample label indicates whether a corresponding training sample is a positive training sample or a negative training sample, wherein the positive training sample is second HTTP packet flow data that is not attacked by the EK, and wherein the negative training sample is third HTTP packet flow data that is attacked by the EK;

train, based on the training samples and the sample label, a plurality of initial detection models to obtain the first behavior detection models, wherein the initial detection models correspond to the different phases;

determine, based on the first behavior detection models and a sample feature set corresponding to each of the first behavior detection models, a sample cross feature set comprising a plurality of sample cross feature vectors that are in a one-to-one correspondence with the training samples; and separately input the sample cross feature vectors into an initial analysis model to obtain the association analysis model.

17. The apparatus of claim 16, wherein when executed by the processor, the instructions further cause the apparatus to:

perform a vulnerability file detection on the training samples to obtain a vulnerability file detection result;

perform a malware detection on the training samples to obtain a malware detection result that correspond to each of the training samples; and further determine, based on the vulnerability file detection result and the malware detection result, the sample cross feature set.

18. The apparatus of claim 17, wherein, when executed by the processor, the instructions further cause the apparatus to:

select a second training sample from the training samples;

separately input, for each of the training samples, sample feature vectors that are in sample feature sets corresponding to the first behavior detection models and that correspond to the second training sample into the first behavior detection models to obtain a plurality of sample probability values;

determine, for each of the training samples and based on the sample probability values, a second vulnerability file detection result that correspond to the second training sample, and a second malware detection result that correspond to the second training sample, a plurality of sample cross features, wherein each of the sample cross features is based on a fourth multiplication of two pieces of different data in the sample probability values, the second vulnerability file detection result, and the second malware detection result; and generate, based on the sample cross features, a second sample cross feature vector.

19. The apparatus of claim 11, wherein, when executed by the processor, the instructions further cause the apparatus to:

obtain a plurality of training samples and a sample label corresponding to each of the training samples, wherein each of the training samples comprises second data in one or more sample HTTP packets of a second data flow, wherein the sample label indicates whether a corresponding training sample is a positive training sample or a negative training sample, wherein the positive training sample is second HTTP packet flow data that is not attacked by the EK, and wherein the negative training sample is third HTTP packet flow data that is attacked by the EK; and train, based on the training samples and the sample label, a plurality of first initial detection models to obtain the first behavior detection models, wherein the first initial detection models correspond to the different phases.

20. A non-transitory computer-readable medium storing programming instructions for execution by at least one processor to:
- obtain, from a host within a reference time period, first Hypertext Transfer Protocol (HTTP) packet flow data comprising first data in one or more HTTP packets, wherein the one or more HTTP packets belong to a first data flow, and wherein the reference time period is a reference duration before a current time;
- determine, based on the first HTTP packet flow data and using a plurality of first behavior detection models, a plurality of first initial probability values, wherein the first behavior detection models describe different phases of a track of an exploit kit (EK) attack behavior, and wherein each of the first initial probability values is output by one of the first behavior detection models;
- determine, based on the first initial probability values, a comprehensive probability value indicating a probability that the host is attacked by an EK in a process in which the host transmits the first data flow; and
- determine that the EK attack behavior exists in the process when the comprehensive probability value is greater than a preset probability threshold.

* * * * *